(12) United States Patent
Kanzaki et al.

(10) Patent No.: US 9,573,540 B2
(45) Date of Patent: Feb. 21, 2017

(54) ON-VEHICLE ELECTRONIC CONTROL DEVICE

(71) Applicant: Mitsubishi Electric Corporation, Chiyoda-ku, Tokyo (JP)

(72) Inventors: Shozo Kanzaki, Chiyoda-ku (JP); Koji Hashimoto, Chiyoda-ku (JP); Kazunari Masudome, Chiyoda-ku (JP); Yoshitake Nishiuma, Chiyoda-ku (JP); Yusuke Matsuda, Chiyoda-ku (JP); Tomohiro Kimura, Chiyoda-ku (JP); Shinji Higashibata, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 271 days.

(21) Appl. No.: 14/449,782

(22) Filed: Aug. 1, 2014

(65) Prior Publication Data
US 2015/0210232 A1    Jul. 30, 2015

(30) Foreign Application Priority Data
Jan. 29, 2014 (JP) ................ 2014-014111

(51) Int. Cl.
*B60R 16/03* (2006.01)
*B60R 16/033* (2006.01)
*H02H 7/18* (2006.01)
*B60R 16/02* (2006.01)
*H02J 7/00* (2006.01)

(52) U.S. Cl.
CPC ............ *B60R 16/033* (2013.01); *B60R 16/03* (2013.01); *H02H 7/18* (2013.01); *B60R 16/02* (2013.01); *H02J 7/00* (2013.01)

(58) Field of Classification Search
CPC ........ B60R 16/03; B60R 16/033; B60R 16/02; H02H 7/18; H02J 7/00
See application file for complete search history.

(56) References Cited

U.S. PATENT DOCUMENTS

| | | | |
|---|---|---|---|
| 2006/0002044 A1* | 1/2006 | Fernald | H02H 7/18 361/84 |
| 2012/0074775 A1* | 3/2012 | Winkler | B60R 16/03 307/10.1 |
| 2012/0169116 A1* | 7/2012 | Graf | H02J 7/0034 307/10.7 |

FOREIGN PATENT DOCUMENTS

| | | |
|---|---|---|
| JP | 2007-082374 A | 3/2007 |
| JP | 2011-020522 A | 2/2011 |

* cited by examiner

*Primary Examiner* — Jared Fureman
*Assistant Examiner* — Joel Barnett
(74) *Attorney, Agent, or Firm* — Sughrue Mion, PLLC; Richard C. Turner

(57) ABSTRACT

On-vehicle electrical loads (121,122) are connected to an on-vehicle battery (101) via a series circuit including a load switching element (221,222) and a reverse current interrupting element (200a) for a load circuit, and a feeding switching element (120A) that is closed in response to closure of a power supply switch (110). The element (FET) (200a) is closed when the switch (110) is closed and a power supply voltage is applied to a load power supply terminal (Vba) connected to the element (120A), to thereby be energized in an energization direction of an internal parasitic diode thereof. The element (200a) is de-energized when the switch (110) is opened. Thus, malfunction is prevented, which occurs when the element (120A) is opened, a short-to-power flows backward via the element (200a) into the terminal (Vba) so as to feed power to another device connected to the element (200a).

17 Claims, 12 Drawing Sheets

ON-VEHICLE ELECTRONIC CONTROL DEVICE

BACKGROUND OF THE INVENTION

1. Field of the Invention

The present invention relates to an on-vehicle electronic control device such as an on-vehicle engine control device and an on-vehicle transmission control device, and more particularly, to an improved on-vehicle electronic control device capable of preventing an abnormal operation from occurring through improper connection of an on-vehicle battery in a reverse polarity and through abnormal contact of part of load wiring to a power supply line, which causes a short-to-power current to flow through a sneak path.

2. Description of the Related Art

In general, at least two systems of power feeding circuits are used as power feeding circuits for an on-vehicle electronic control device. One system is a power feeding circuit for a constant voltage power supply that is fed power from an on-vehicle battery so as to supply a predetermined stable control voltage to a microprocessor that controls drive of a plurality of on-vehicle electrical loads via a plurality of load switching elements in response to an operation state of an input sensor group and the content of a cooperating program memory.

The other system is a power feeding circuit for the plurality of load switching elements that are controlled to be switched by the microprocessor. The load switching elements are connected to the plurality of on-vehicle electrical loads, which are connected to an external part of the on-vehicle electronic control device, to thereby control the drive of the plurality of on-vehicle electrical loads.

For example, referring to FIG. 3 of "ON-VEHICLE POWER SUPPLY CONTROL DEVICE" in Japanese Patent Application Laid-open No. 2011-020522 illustrated in FIG. 13, in an on-vehicle power supply control device 10, an IG relay 23 and an ACC relay 24 are provided between an input terminal 11 connected to a battery and output terminals 14 and 15 connected to ECUs 50a to 50c corresponding to the on-vehicle electronic control devices, and a control circuit 27 controls on/off of the IG relay 23 and the ACC relay 24 based on information relating to a connection state of an ignition switch and an accessory switch of a vehicle, which is received by a communication circuit 28.

Further, only fuses 26 are connected between the input terminal 11 connected to the battery and output terminals 13 connected to the ECUs 50a to 50c corresponding to the on-vehicle electronic control devices (detailed connection is omitted in FIG. 13), and a step-down circuit 22 and current limiting circuits 25 are provided between the input terminal 11 and output terminals 12 to supply a constant DC voltage of 5 V.

Therefore, in a case of an on-vehicle electronic control device without an accessory-related electrical load, the on-vehicle electronic control device includes two systems of power feeding circuits, specifically, a power feeding circuit for driving an ignition-switch-related electrical load and a power feeding circuit for feeding power to the microprocessor in the on-vehicle electronic control device.

Note that, in the on-vehicle electronic control device that requires not only DC 5 V but also various constant voltages, it is necessary to use any one of the output terminals 13 to 15 instead of the output terminal 12 so that power is fed to various constant voltage power supplies in the on-vehicle electronic control device.

Note that, when an electromagnetic relay in which a diode is connected in series to an exciting coil is used as the IG relay 23 and the ACC relay 24, the electromagnetic relay is not energized in a case where the connection polarity of the on-vehicle battery is improper, and hence the output contact thereof is not closed. Therefore, the electromagnetic relay has both the reverse connection preventing function for an abnormal state and the energization switching function for a normal state.

On the other hand, regarding the load switching element, a field effect transistor has a low internal resistance and small temperature rise even when a large current flows, and hence the field effect transistor is often used as a switching element for a power circuit.

Further, it is well known to use a non-contact switching element in which a pair of field effect transistors is connected in series so that energization directions of the internal parasitic diodes thereof are opposite to each other, to thereby have a reverse connection protecting function and a switching element function.

However, the field effect transistor has a parasitic diode that is connected in parallel in an opposite direction to the energization direction. Therefore, there occurs a short-to-power abnormality in which the output side of the transistor is abnormally brought into contact with a positive power supply line. When the power supply on the input side of the transistor is interrupted, there is a problem in that power is fed through a sneak path from a short-to-power power supply to the input of the transistor.

For example, referring to FIG. 4 of "POWER SUPPLY REVERSE CONNECTION PROTECTING CIRCUIT" in Japanese Patent Application Laid-open No. 2007-082374 illustrated in FIG. 14, in an ECU 45 corresponding to the on-vehicle electronic control device that operates based on the power of a battery 3, an N-channel FET 21 is provided on power supply wiring 15 that connects a power supply terminal 5 connected to a positive terminal of the battery 3 to a control circuit 13 to be supplied with power so that an anode of a parasitic diode D1 thereof is provided on the power supply terminal 5 side. Further, on the downstream side of the FET 21, an N-channel FET 22 is provided so that a cathode of a parasitic diode D2 thereof is provided on the FET 21 side.

Then, in a case where an ignition key switch 9 is turned on when the battery 3 is connected normally, the FETs 21 and 22 are turned on by charge pump circuits 43 and 47 supplied with operation power from the drain side of the FET 21. Thus, power of the battery 3 is supplied to the control circuit 13.

Further, when the battery 3 is connected reversely, the FETs 21 and 22 are turned off to block a reverse current by the parasitic diode D1.

Note that, the control circuit 13 carries out processing for controlling a control target (on-vehicle device such as an engine and a transmission) and driving of an actuator. The control circuit 13 includes a power supply circuit (not shown) for generating a constant power supply voltage (for example, 5 V) from a battery voltage VB input through the power supply wiring 15, various ICs 19 such as a microcomputer that operates by receiving the power supply voltage generated by the power supply circuit, and an output circuit (not shown) for driving the actuator based on a signal from the IC 19 (based on paragraph 0042).

Further, the control circuit 13 starts its operation when the FET 22 turns on so that the control circuit 13 receives power from the battery 3. When the control circuit 13 starts its operation, a drive signal Sd is output so that the FETs 21 and 22 are maintained in the on state even if the ignition key switch 9 is turned off (based on paragraph 0056).

Further, although not shown, the control circuit 13 monitors the voltage of a signal input terminal 11 in order to detect the on/off state of the ignition key switch 9.

Then, the control circuit 13 detects that the ignition key switch 9 has been turned off based on the voltage of the signal input terminal 11. After that, when the operation stop preprocessing such as data saving is ended and a condition that allows operation stop is satisfied, the output of the drive signal Sd is stopped (based on paragraph 0057).

In Japanese Patent Application Laid-open No. 2011-020522 described above, when there occurs such a short-to-power abnormality that load wiring from the ECUs 50a to 50c corresponding to the on-vehicle electronic control devices to the on-vehicle electrical loads is abnormally brought into contact with the power supply wiring connected to the output terminal 14, even if the IG relay 23 is closed, the short-to-power power is fed through a sneak path into the output wiring of the IG relay 23 to cause the following problems.

The first problem is a power wasting and malfunction problem. Even when the IG relay 23 is interrupted, power is erroneously fed to each of the combined on-vehicle electronic control devices (ECU 50a to ECU 50c). Thus, power is wasted and the on-vehicle electronic control device malfunctions.

The second problem is a component damage problem. An excess current flows through the parasitic diode inside the load switching element at a position in the sneak path of the short-to-power power to burn out the load switching element.

The third problem is as follows. When the drive circuit of the IG relay 23 has an abnormality determination function, the output voltage is generated even if the exciting coil of the IG relay 23 is not energized, and hence occurrence of a welding abnormality of the output contact may be erroneously determined.

The fourth problem is another power wasting and malfunction problem. When the constant voltage power supply is connected in a branched manner from the output terminal 14 of the IG relay 23, the short-to-power power is fed through a sneak path as the input voltage of the constant voltage power supply.

In Japanese Patent Application Laid-open No. 2007-082374 described above, the twin switching elements 21 and 22 are provided in a non-contact form in which the N-channel or P-channel field effect transistors are connected in series and the energization directions of the parasitic diodes thereof are set to be opposite to each other, to thereby provide the reverse connection protecting function corresponding to the electromagnetic relay and the switching element function. The twin switching elements 21 and 22 are incorporated in the ECU 45 corresponding to the on-vehicle electronic control device so as to feed power to the constant voltage power supply for driving the microprocessor and also feed power in a branched manner to the output circuit for driving the actuator.

Therefore, when a short-to-power abnormality occurs on the load wiring for the on-vehicle electrical load, even if the ignition key switch 9 that is a power supply switch is opened, the short-to-power power is fed through a sneak path as power for the constant voltage power supply or other load circuits whose power is fed from the same twin switching elements 21 and 22, with the result that the above-mentioned first to fourth problems occur.

SUMMARY OF THE INVENTION

In view of the above, a first object of the present invention is to provide a simple on-vehicle electronic control device including: a first power feeding circuit that is directly connected to an on-vehicle battery, and is configured to feed power to a constant voltage power supply for driving a microprocessor; and a second power feeding circuit that is fed power from the on-vehicle battery via a feeding switching element that is controlled from outside, and is configured to feed power to a plurality of load switching elements that control drive of a plurality of on-vehicle electrical loads connected externally. The simple on-vehicle electronic control device has a reverse connection protecting function for when the voltage polarity of the on-vehicle battery is improper, and a protecting function against a short-to-power abnormality in which load wiring is abnormally brought into contact with a positive power supply line.

Further, a second object of the present invention is to provide a simple on-vehicle electronic control device including: a first power feeding circuit that is connected to an on-vehicle battery via a feeding switching element that is controlled inside the on-vehicle electronic control device, and is configured to feed power to a constant voltage power supply for driving a microprocessor; and a second power feeding circuit that is connected to the on-vehicle battery via the same feeding switching element, and is configured to feed power to a plurality of load switching elements that control drive of a plurality of on-vehicle electrical loads connected externally. The simple on-vehicle electronic control device has a reverse connection protecting function for when the voltage polarity of the on-vehicle battery is improper, and a protecting function against a short-to-power abnormality in which load wiring is abnormally brought into contact with a positive power supply line.

An on-vehicle electronic control device according to a first embodiment of the present invention includes: a microprocessor for controlling drive of a plurality of on-vehicle electrical loads via a plurality of load switching elements in response to an operation state of an input sensor group and a content of a cooperating program memory; and a constant voltage power supply that is fed power from an on-vehicle battery so as to supply a predetermined stable control voltage to the microprocessor. The microprocessor is configured to start a control operation when a power supply switch is closed, perform a predetermined after-run based on one of a self-holding command signal and an output enabling signal even when the power supply switch is opened after the power supply switch is once closed, and then stop by itself. The constant voltage power supply is configured to be fed power from a control power supply terminal that is directly connected to the on-vehicle battery via a reverse current interrupting element for a power supply circuit, and start generation of the predetermined stable control voltage based on a start-up signal generated by a start-up circuit in response to an operation of the power supply switch. The start-up circuit is configured to generate the start-up signal when the power supply switch is closed, and maintain, when the power supply switch is closed, generation of the start-up signal until the predetermined after-run is finished even when the power supply switch is opened.

Further, each of the plurality of on-vehicle electrical loads is fed power to be driven from a load power supply terminal, which is connected to the on-vehicle battery via a feeding switching element that enters a closed state at least when the power supply switch is closed, via a series circuit including a reverse current interrupting element for a load circuit and corresponding one of the plurality of load switching elements. As at least a part of the plurality of load switching elements, a field effect transistor is used, which is connected in such a polarity that, when being driven to be energized by the microprocessor, a drive current for any one of the plurality of on-vehicle electrical loads flows in an opposite direction to an energization direction of an internal parasitic diode of the field effect transistor. As the reverse current interrupting element for a power supply circuit, a field effect transistor is used, which is connected in such a manner that, when the on-vehicle battery is connected in a normal polarity, the field effect transistor is driven to be energized in the same direction as an internal parasitic diode of the field effect transistor so as to feed power to the constant voltage power supply, and when the on-vehicle battery is connected in an abnormal reverse polarity, a gate voltage becomes a reverse polarity so as to stop drive for energization.

Further, as the reverse current interrupting element for a load circuit, a field effect transistor is used, which is connected in such a relationship that, in a case where the on-vehicle battery is connected in the normal polarity when a load current flows, the load current for the plurality of on-vehicle electrical loads flows in the same direction as an energization direction of an internal parasitic diode of the field effect transistor, and in a case where the on-vehicle battery is connected in the abnormal reverse polarity, a gate voltage becomes a reverse polarity to interrupt the load current. The reverse current interrupting element for a load circuit is configured to interrupt energization when the on-vehicle battery is connected in the abnormal reverse polarity. The reverse current interrupting element for a load circuit is driven to be closed when one of a state in which the power supply switch is closed and a state in which the start-up signal is generated is achieved, and when a state in which a normal polarity power supply voltage is applied to the load power supply terminal is achieved. The reverse current interrupting element for a load circuit is opened one of when the power supply switch is opened and when generation of the start-up signal is stopped in a case where a short-to-power abnormality in which load wiring is abnormally brought into contact with positive wiring of the on-vehicle battery occurs, to thereby prevent a short-to-power current from flowing through a sneak path into the load power supply terminal at least when the feeding switching element is in an opened state.

An on-vehicle electronic control device according to a second embodiment of the present invention includes: a microprocessor for controlling drive of a plurality of on-vehicle electrical loads via a plurality of load switching elements in response to an operation state of an input sensor group and a content of a cooperating program memory; and a constant voltage power supply that is fed power from an on-vehicle battery so as to supply a predetermined stable control voltage to the microprocessor. The microprocessor is configured to start a control operation when a power supply switch is closed, perform a predetermined after-run based on one of a self-holding command signal and an output enabling signal even when the power supply switch is opened after the power supply switch is once closed, and then stop by itself. The constant voltage power supply is configured to be fed power from a load feeding terminal that is connected to the on-vehicle battery via a feeding switching element to generate the predetermined stable control voltage, the feeding switching element being driven to be closed by a start-up circuit. The start-up circuit is configured to generate feeding command signal when the power supply switch is closed, and maintain, when the power supply switch is once closed, generation of the feeding command signal until the predetermined after-run is finished even when the power supply switch is opened.

Further, each of the plurality of on-vehicle electrical loads is fed power to be driven from the load power supply terminal via a series circuit including a reverse current interrupting element for a load circuit and corresponding one of the plurality of load switching elements. As at least a part of the plurality of load switching elements, a field effect transistor is used, which is connected in such a polarity that, when being driven to be energized by the microprocessor, a drive current for any one of the plurality of on-vehicle electrical loads flows in an opposite direction to an energization direction of an internal parasitic diode of the field effect transistor. As the reverse current interrupting element for a load circuit, a field effect transistor is used, which is connected in such a relationship that, in a case where the on-vehicle battery is connected in the normal polarity when a load current flows, the load current for the plurality of on-vehicle electrical loads flows in the same direction as an energization direction of an internal parasitic diode of the field effect transistor, and in a case where the on-vehicle battery is connected in the abnormal reverse polarity, a gate voltage becomes a reverse polarity to stop the load current. The reverse current interrupting element for a load circuit is configured to interrupt energization when the on-vehicle battery is connected in the abnormal reverse polarity. The reverse current interrupting element for a load circuit is driven to be closed when one of a state in which the power supply switch is closed and a state in which the feeding command signal is generated is achieved, and when a state in which a normal polarity power supply voltage is applied to the load power supply terminal is achieved. The reverse current interrupting element for a load circuit is opened one of when the power supply switch is opened and when generation of the feeding command signal is stopped in a case where a short-to-power abnormality in which load wiring is abnormally brought into contact with positive wiring of the on-vehicle battery occurs, to thereby prevent a short-to-power current from flowing through a sneak path into the load power supply terminal at least when the feeding switching element is in an opened state.

In the on-vehicle electronic control device according to the first embodiment of the present invention described above, the constant voltage power supply for feeding power to the microprocessor is directly connected to the on-vehicle battery via the reverse current interrupting element for a power supply circuit. The constant voltage power supply starts to generate the control voltage when the power supply switch is closed in cooperation with the start-up circuit, and stops to generate the control voltage after a predetermined after-run is performed even when the power supply switch is opened. Further, each of the plurality of on-vehicle electrical loads is connected to the on-vehicle battery via the series circuit including the load switching element and the reverse current interrupting element for a load circuit, and via the feeding switching element that is closed when the power supply switch is closed. The reverse current interrupting element for a load circuit is driven to be closed when the state in which the power supply switch is closed or the state in which the start-up signal is generated is achieved, and when the state in which the power supply voltage is applied to the load power supply terminal connected to the feeding switching element is achieved. A power feeding circuit for a microprocessor and a power feeding circuit for a load circuit are separated from each other by the reverse current interrupting element for a load circuit.

Therefore, even when a short-to-power abnormality in which feeding wiring of the on-vehicle electrical load is abnormally brought into contact with positive wiring of the on-vehicle battery occurs, if the power supply switch is opened or the start-up signal for the constant voltage power supply is stopped, the drive of energization of the reverse current interrupting element for a load circuit is stopped. Therefore, the following effect is obtained. It is possible to prevent malfunction of an another combined on-vehicle electronic control device, which occurs in a case where, when the feeding switching element is opened, the short-to-power power flows backward via the reverse current interrupting element into the load power supply terminal so as to feed power to the another combined on-vehicle electronic control device connected to the feeding switching element.

Further, during a period in which the power supply switch is closed and the feeding switching element is not driven to be closed yet, the drive of energization of the reverse current interrupting element for a load circuit is stopped. Therefore, the following effect is obtained. It is possible to prevent malfunction of the combined on-vehicle electronic control device, which occurs in a case where, when short-to-power occurs in the load circuit, the short-to-power power flows backward into the load power supply terminal.

Further, even in a case where a short-circuit abnormality occurs in the feeding switching element, when the power supply switch is opened, the constant voltage power supply stops to generate the control voltage. Thus, the microprocessor stops the control operation, and the load switching element is opened. In this manner, an effect of preventing unnecessary current consumption may be obtained.

In addition, in the on-vehicle electronic control device according to the second embodiment of the present invention, the constant voltage power supply for feeding power to the microprocessor is connected to the on-vehicle battery via the feeding switching element closed by the start-up circuit. The feeding switching element is closed when the power supply switch is closed, and is opened after maintaining a closure operation during a period in which the microprocessor performs a predetermined after-run even when the power supply switch is opened. Further, each of the plurality of on-vehicle electrical loads is connected to the on-vehicle battery via the series circuit including the load switching element and the reverse current interrupting element for a load circuit, and via the feeding switching element. The reverse current interrupting element for a load circuit is driven to be closed when the state in which the power supply switch is closed or the state in which the feeding command signal is generated is achieved, and when the state in which the power supply voltage is applied to the load power supply terminal connected to the feeding switching element is achieved. A power feeding circuit for a microprocessor and a power feeding circuit for a load circuit are separated from each other by the reverse current interrupting element for a load circuit.

Therefore, even when a short-to-power abnormality in which feeding wiring of the on-vehicle electrical load is abnormally brought into contact with positive wiring of the on-vehicle battery occurs, if the power supply switch is opened or the feeding command signal for the feeding switching element is stopped, the drive of energization of the reverse current interrupting element for a load circuit is stopped. Therefore, the following effect is obtained. It is possible to prevent malfunction of an another combined on-vehicle electronic control device, which occurs in a case where, when the feeding switching element is opened, the short-to-power power flows backward via the reverse current interrupting element into the load power supply terminal so as to feed power to the another combined on-vehicle electronic control device connected to the feeding switching element. Further, it is also possible to avoid a situation where the short-to-power power flows through a sneak path into the constant voltage power supply, and power feeding to the constant voltage power supply cannot be stopped.

Further, during a period in which the power supply switch is closed and the feeding switching element is not driven to be closed yet, the drive of energization of the reverse current interrupting element for a load circuit is stopped. Therefore, the following effect is obtained. It is possible to prevent malfunction of the combined on-vehicle electronic control device, which occurs in a case where, when short-to-power occurs in the load circuit, the short-to-power power flows backward into the load power supply terminal.

DETAILED DESCRIPTION OF THE PREFERRED EMBODIMENTS

Now, an on-vehicle electronic control device according to the present invention is described by means of respective embodiments with reference to the drawings. Note that, in the respective embodiments, like or corresponding parts are denoted by like reference symbols, and overlapping description thereof is omitted.

First Embodiment (1) Detailed Description of Configuration

Now, a configuration of an on-vehicle electronic control device according to a first embodiment of the present invention is described in detail with reference to FIG. 1 being an overall circuit diagram thereof.

Figure 1:
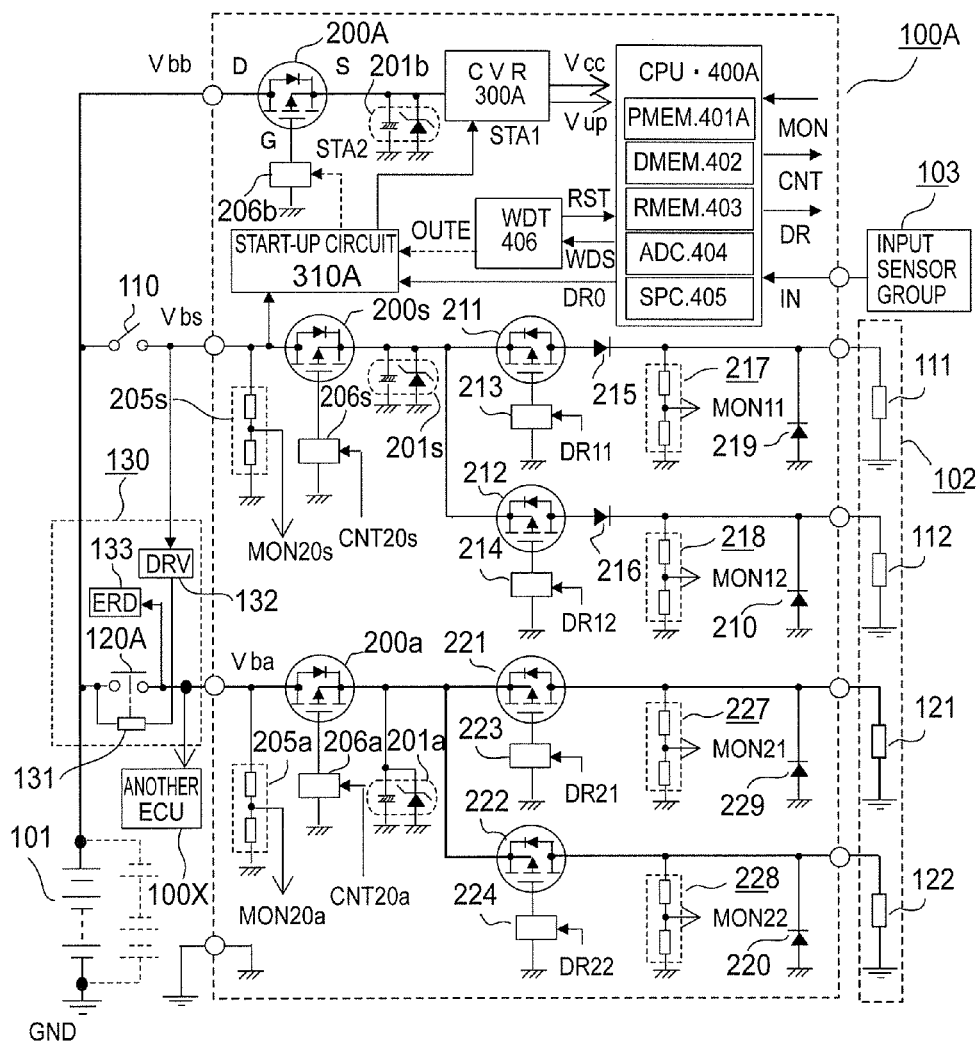
FIG. 1 is an overall circuit diagram of an on-vehicle electronic control device according to a first embodiment of the present invention.

In FIG. 1, an on-vehicle electronic control device 100A includes a control power supply terminal Vbb directly connected to a positive terminal of an on-vehicle battery 101 via a fuse (not shown), a ground terminal connected to a ground circuit GND that is a vehicle body connected to a negative terminal of the on-vehicle battery 101, a power supply switch terminal Vbs connected to the positive terminal of the on-vehicle battery 101 via a manual power supply switch 110 that is an ignition switch, for example, and a load power supply terminal Vba connected to the positive terminal of the on-vehicle battery 101 via a feeding switching element 120A.

The feeding switching element 120A is, for example, an output contact of an electromagnetic relay including an exciting coil 131, and the electromagnetic relay is unidirectionally energized by an exciting circuit 132 incorporated in a feeding unit 130. When the power supply switch 110 is closed and the connection polarity of the on-vehicle battery 101 is correct, the output contact 120A is closed so that an abnormality detection circuit 133 incorporated in the feeding unit 130 detects abnormalities such as generation of the output voltage of the feeding switching element 120A even when the exciting coil 131 is not energized or failure in generation of the output voltage of the feeding switching element 120A even when the exciting coil 131 is energized.

Note that, when the on-vehicle electronic control device 100A is, for example, a transmission control device, the feeding switching element 120A may also feed power to, for example, a combined on-vehicle electronic control device 100X (another ECU 100X) that is an engine control device, and the energization of the exciting coil 131 may be controlled in the engine control device.

Further, as the feeding switching element 120A, instead of the above-mentioned electromagnetic relay (actually, a part including the feeding switching element 120A, the exciting coil 131, and the exciting circuit 132), there may be employed a non-contact switching element in which a pair of field effect transistors are connected in series so that the energization directions of internal parasitic diodes thereof are opposite to each other, to thereby provide a reverse connection protecting function and a switching element function.

In an on-vehicle electrical load group 102, a plurality of light loads 111 and 112 are loads as represented by the exciting coil of the electromagnetic relay and an indicator for abnormality alarm. The light loads 111 and 112 are connected to the on-vehicle electronic control device 100A via light load drive terminals.

In the on-vehicle electrical load group 102, a plurality of on-vehicle electrical loads 121 and 122 are motors or solenoid coils for driving a solenoid valve, and are connected to the on-vehicle electronic control device 100A via load drive terminals.

An input sensor group 103 that is a switching sensor or an analog sensor is connected to an input terminal of the on-vehicle electronic control device 100A so as to be connected to a microprocessor 400A via an input interface circuit (not shown).

A battery voltage that varies in a range of 7 V to 16 V in a normal state is applied to a constant voltage power supply 300A (CVR 300A) provided inside the on-vehicle electronic control device 100A from the control power supply terminal Vbb connected to the on-vehicle battery 101 via a reverse current interrupting element 200A that is a P-channel field effect transistor. The constant voltage power supply 300A generates a stable control voltage Vcc that is supplied to the microprocessor 400A.

Between a power supply input terminal of the constant voltage power supply 300A and the ground circuit, a protective circuit 201b including one or both of, for example, a polar capacitor that is an electrolytic capacitor and a voltage limiting diode that is a constant voltage diode is connected so as to prevent entrance of a high-voltage noise generated at an external power supply line.

Note that, after a power supply voltage is input to the power supply input terminal of the constant voltage power supply 300A, a start-up circuit 310A described later with reference to FIG. 2 generates a start-up signal STA1 that is a feeding start signal, which is input to a start-up terminal of the constant voltage power supply 300A to generate the control voltage Vcc.

Note that, a backup voltage Vup for feeding power to a RAM memory (RMEM) 403 that cooperates with the microprocessor (CPU) 400A is always generated independently of the start-up signal STA1.

The reverse current interrupting element 200A for a power supply circuit has a drain terminal D connected to the control power supply terminal Vbb, a source terminal S connected to the power supply input terminal of the constant voltage power supply 300A, and a gate terminal G connected to the ground circuit via a reverse current stop gate circuit 206b. When a start-up signal STA2 that is the same signal as the start-up signal STA1 is generated, the reverse current stop gate circuit 206b is energized, and the potential of the gate terminal G becomes lower than the potential of the source terminal S. Thus, energization between the drain terminal D and the source terminal S is achieved.

The energization direction between the drain terminal D and the source terminal S is from any one terminal having a higher potential to the other terminal having a lower potential, but an internal parasitic diode is generated in a parallel state between the drain terminal D and the source terminal S. Therefore, a current flowing from the drain terminal D to the source terminal S cannot be interrupted even when the gate circuit is interrupted.

Therefore, power for generating the backup voltage Vup is fed via this parasitic diode.

The microprocessor 400A incorporates a non-volatile program memory (PMEM) 401A that is a flash memory, for example, a non-volatile data memory (DMEM) 402 that is a partial region of the program memory 401A or that can easily perform electrical reading and writing, the RAM memory (RMEM) 403 that is a volatile memory for arithmetic processing, a multi-channel AD converter (ADC) 404, and a serial-parallel converter (SPC) 405 for serial communication. The microprocessor 400A generates a command signal CNT and a drive command signal DR based on a monitor signal MON to be described later and a digital or analog input signal IN obtained from the input sensor group 103.

A watchdog timer (WDT) 406 monitors a signal pulse width of a watchdog signal WDS that is a pulse train generated by the microprocessor 400A. The watchdog timer (WDT) 406 generates a reset signal RST when the signal pulse width is a predetermined value or more to initialize the microprocessor 400A for restart, and generates an output enabling signal OUTE when the signal pulse width is less than the predetermined value so that a control output is generated from the microprocessor 400A.

A relationship between the start-up circuit 310A and a self-holding command signal DR0 generated by the microprocessor 400A or the output enabling signal OUTE generated by the watchdog timer 406 is described with reference to FIG. 2.

In the on-vehicle electrical load group 102, the plurality of light loads 111 and 112 are fed power from the power supply switch terminal Vbs via a common reverse current interrupting element 200s, a common protective circuit 201s, individual light load switching elements 211 and 212, and individual reverse current blocking diodes 215 and 216. The light loads 111 and 112 are generally connected in parallel to individual commutation diodes 219 and 210.

Note that, the internal parasitic diode of the reverse current interrupting element 200s that is a P-channel field effect transistor can be energized in the same direction as the drive current of the light loads 111 and 112, while the internal parasitic diodes of the light load switching elements 211 and 212 are connected in a polarity that allows energization in a direction opposite to the drive current of the light loads 111 and 112.

Gate terminals of the light load switching elements 211 and 212 which are P-channel field effect transistors are connected to the ground circuit via switching gate circuits 213 and 214, respectively. The switching of the switching gate circuits 213 and 214 is controlled by light load drive command signals DR11 and DR12 generated by the microprocessor 400A. Voltages across the light loads 111 and 112 are divided by voltage dividing resistors 217 and 218 to be input to the microprocessor 400A as light load voltage monitor signals MON11 and MON12, respectively.

A voltage applied to the power supply switch terminal Vbs is divided by a voltage dividing resistor 205s to be input to the microprocessor 400A as a command monitor signal MON20s. A gate terminal of the reverse current interrupting element 200s is connected to the ground circuit via a reverse current stop gate circuit 206s. The switching of the reverse current stop gate circuit 206s is controlled by a light load power receiving command signal CNT20s generated by the microprocessor 400A.

Note that, the light loads 111 and 112 are connected in series to the reverse current blocking diodes 215 and 216, and hence even when a short-to-power abnormality occurs in the load wiring, a short-to-power current does not flow inside through a sneak path.

However, the reverse current interrupting element 200s is a reverse current interrupting element for a protective circuit, which is provided so as to prevent, in a case where the connection polarity of the on-vehicle battery 101 is improper, the protective circuit 201s including one or both of a polar capacitor and a voltage limiting diode from being damaged when a reverse voltage is applied thereto.

Therefore, the reverse current interrupting element 200s for a protective circuit may be a simple reverse current blocking diode, but even in the case of a light load, a resultant current becomes large when a large number of light loads are driven, and hence a field effect transistor that is small in voltage drop when being closed is used.

Further, in the case of a simple diode, the polar capacitor in the protective circuit 201s is high-voltage charged by an external high-voltage noise, and hence there is a problem in that, under a state in which both of the light load switching elements 211 and 212 are closed, there is no discharge destination for the polar capacitor. However, when the field effect transistor is used, by setting the reverse current stop gate circuit 206s in an energized state, charges stored in the polar capacitor can be discharged to the start-up circuit 310A, the voltage dividing resistor 205s, and the on-vehicle battery 101 via the power supply switch 110.

In the on-vehicle electrical load group 102, the plurality of on-vehicle electrical loads 121 and 122 are fed power from the load power supply terminal Vba via a common reverse current interrupting element 200a, a common protective circuit 201a, and individual load switching elements 221 and 222. The on-vehicle electrical loads 121 and 122 are generally connected in parallel to individual commutation diodes 229 and 220.

Note that, the internal parasitic diode of the reverse current interrupting element 200a that is a P-channel field effect transistor can be energized in the same direction as the drive current of the on-vehicle electrical loads 121 and 122, while the internal parasitic diodes of the load switching elements 221 and 222 are connected in a polarity that allows energization in a direction opposite to the drive current of the on-vehicle electrical loads 121 and 122.

Gate terminals of the load switching elements 221 and 222 which are P-channel field effect transistors are connected to the ground circuit via switching gate circuits 223 and 224, respectively. The switching of the switching gate circuits 223 and 224 is controlled by load drive command signals DR21 and DR22 generated by the microprocessor 400A. Voltages across the on-vehicle electrical loads 121 and 122 are divided by voltage dividing resistors 227 and 228 to be input to the microprocessor 400A as load voltage monitor signals MON21 and MON22, respectively.

A voltage applied to the load power supply terminal Vba is divided by a voltage dividing resistor 205a to be input to the microprocessor 400A as a power receiving monitor signal MON20a. A gate terminal of the reverse current interrupting element 200a is connected to the ground circuit via a reverse current stop gate circuit 206a. The switching of the reverse current stop gate circuit 206a is controlled by a load power receiving command signal CNT20a generated by the microprocessor 400A.

Note that, a reverse current blocking diode for preventing temperature rise and voltage drop is not connected in series to the on-vehicle electrical loads 121 and 122 through which a relatively large current flows. Therefore, when the feeding switching element 120A is opened, there is a risk that a short-to-power current flows through a sneak path into the load power supply terminal Vba through the parasitic diodes in the load switching elements 221 and 222 when a short-to-power abnormality occurs in the load wiring.

In this case, even if the feeding switching element 120A is opened, power is fed into the other combined on-vehicle electronic control device (ECU) 100X.

However, when the feeding switching element 120A is opened, the power supply switch 110 is generally opened. In this case, the reverse current stop gate circuit 206a interrupts the gate circuit of the reverse current interrupting element 200a to de-energize the reverse current interrupting element 200a. In this manner, a short-to-power current is prevented from flowing through a sneak path.

Further, when the feeding switching element 120A is opened even if the power supply switch 110 is closed, the microprocessor 400A detects the short-to-power abnormality so as to cause the reverse current stop gate circuit 206a to interrupt the gate circuit of the reverse current interrupting element 200a.

Next, a configuration of a power feeding circuit from the control power supply terminal Vbb of the on-vehicle electronic control device of FIG. 1 is described in detail with reference to FIG. 2 being a detailed circuit diagram thereof.

Figure 2:
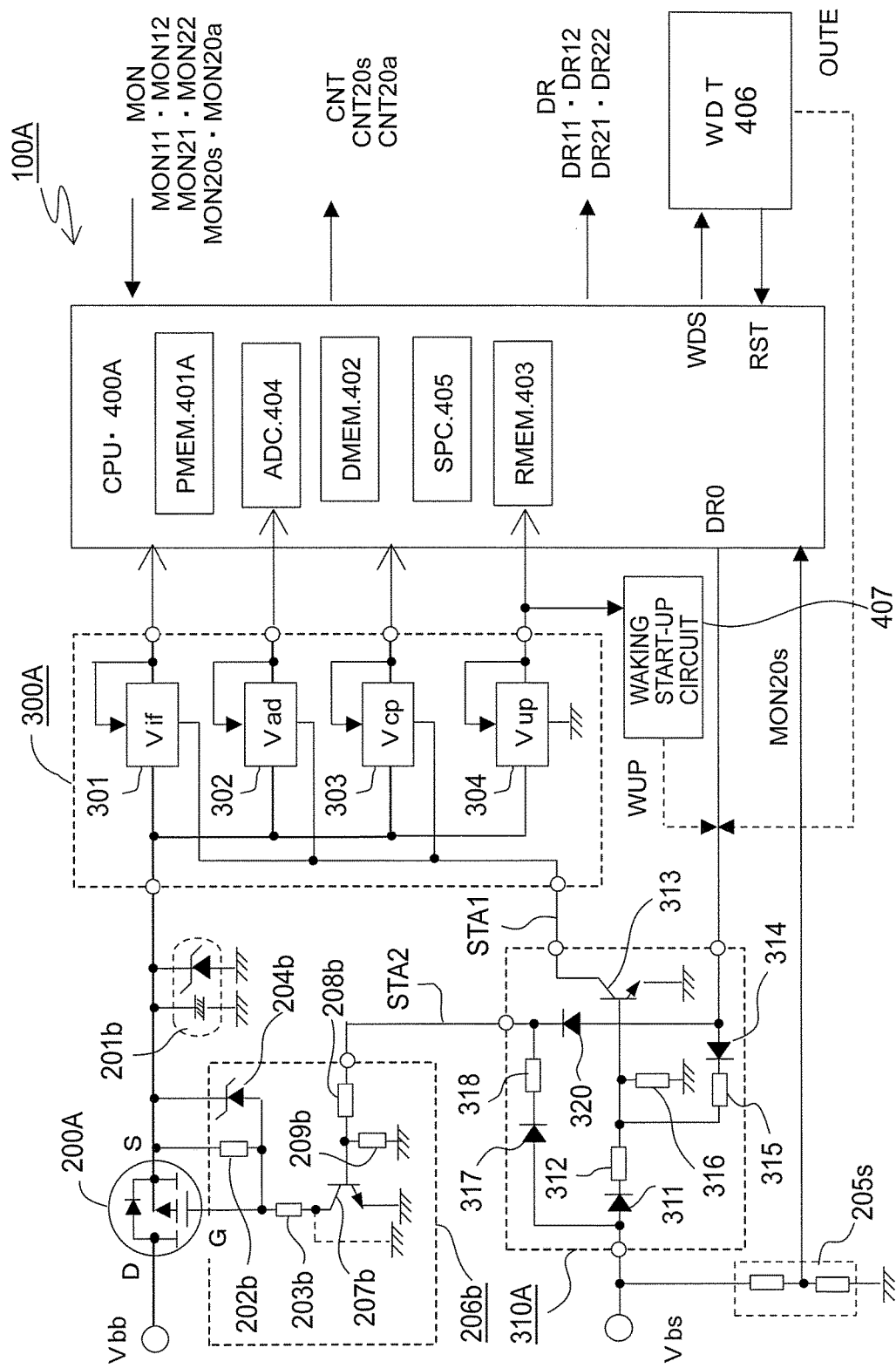
FIG. 2 is a detailed circuit diagram of a power feeding circuit from a control power supply terminal of the on-vehicle electronic control device of FIG. 1.

In FIG. 2, the reverse current stop gate circuit 206b connected to the gate terminal of the reverse current interrupting element 200A for a power supply circuit includes a voltage dividing resistor 202b connected between the source terminal S and the gate terminal G, and a voltage dividing resistor 203b and an energization command transistor 207b connected in series to each other between the gate terminal G and the ground circuit. When the energization command transistor 207b is closed, a power supply voltage is applied from the control power supply terminal Vbb via the internal parasitic diode of the reverse current interrupting element 200A to the voltage dividing resistors 202b and 203b. The voltage across the voltage dividing resistor 202b among those resistors is applied between the source terminal and the gate terminal of the reverse current interrupting element 200A.

Note that, a constant voltage diode 204b is connected in parallel to the voltage dividing resistor 202b so as to limit the source/gate voltage from being excessive.

Further, a base terminal of the energization command transistor 207b that is an NPN junction type transistor is driven to be energized by the start-up signal STA2 generated by the start-up circuit 310A via a base resistor 208b. Further, an open-circuit ballast resistor 209b is connected between the base terminal and an emitter terminal.

The constant voltage power supply 300A is fed power from the reverse current interrupting element 200A to generate the stable control voltage Vcc. The constant voltage power supply 300A includes a first control power supply 301 for generating a first control voltage Vif, a second control power supply 302 for generating a second control voltage Vad, and a third control power supply 303 for generating a third control voltage Vcp as the control voltage Vcc, and incorporates a backup power supply 304 for generating the backup voltage Vup.

Note that, the first control voltage Vif is a low-accuracy and large-capacity 5-V DC voltage, and is used as power for an interface circuit. The second control voltage Vad is a high-accuracy and small-capacity 5-V DC voltage, and is used as power for an analog signal. The third control voltage Vcp is a low-accuracy and large-capacity 3.3-V DC voltage, and is used as power for the microprocessor 400A, the program memory 401A, the data memory 402, the RAM memory 403, and the like.

The control voltage Vcc is a representative voltage of those first to third control voltages, and the first control voltage Vif and the second control voltage Vad can be unified as a high-accuracy and large-capacity 5-V DC voltage.

Each of the first to third control power supplies 301 to 303 has a start-up terminal to which the start-up signal STA1 generated by the start-up circuit 310A is input. When the logic level of the start-up signal STA1 becomes "L", the first to third control voltages Vif, Vad, and Vcp represented by the control voltage Vcc are generated.

The reverse current interrupting element 200A or the backup power supply 304 that is always fed power through the internal parasitic diode of the reverse current interrupting element 200A generates, for example, a low-accuracy and small-capacity voltage of DC 2.8 V to feed power to the RAM memory 403 when the control voltage Vcc is stopped, and also generates, for example, a low-accuracy and small-capacity voltage of DC 5 V to always feed power to a waking start-up circuit 407.

The waking start-up circuit 407 is, for example, a soak timer that measures an elapse time from the stop of the control operation of the microprocessor 400A, generates a waking command signal WUP when the elapse time reaches a predetermined time period, and sets to achieve writing from the microprocessor 400A before the microprocessor 400A is stopped for the predetermined elapse time period. Alternatively, the waking start-up circuit 407 is a communication circuit that generates the waking command signal WUP received from a host station via a communication line.

The start-up circuit 310A includes a start-up transistor 313 that is driven to be energized from the power supply switch terminal Vbs via a start-up diode 311 and a series resistor 312. The start-up transistor 313 is an NPN junction type transistor whose energization is held by a holding diode 314 and a series resistor 315 when the microprocessor 400A generates the self-holding command signal DR0, and an open-circuit ballast resistor 316 is connected between an emitter terminal and a base terminal of the start-up transistor 313.

The start-up circuit 310A further supplies the start-up signal STA2 to the reverse current stop gate circuit 206b from the power supply switch terminal Vbs via a start-up diode 317 and a series resistor 318, and supplies, when the microprocessor 400A generates the self-holding command signal DR0, the start-up signal STA2 to the reverse current stop gate circuit 206b via a holding diode 320.

When the microprocessor 400A receives the control voltage Vcc from the constant voltage power supply 300A, the microprocessor 400A performs power-on reset, and then starts a control operation. Thus, the microprocessor 400A generates the watchdog signal WDS, and recognizes that the power supply switch 110 is closed by the command monitor signal MON20s, to thereby generate the self-holding command signal DR0.

Therefore, the start-up circuit 310A generates the start-up signals STA1 and STA2 when the power supply switch 110 is closed. When the microprocessor 400A is activated to generate the self-holding command signal DR0 or to cause the watchdog timer 406 to generate the output enabling signal OUTE, even if the power supply switch 110 is opened, the generation of the start-up signals STA1 and STA2 is thereafter maintained. When the microprocessor 400A finishes the after-run and stops by itself, the start-up signals STA1 and STA2 are also stopped.

Even if the power supply switch 110 is not closed, when the waking start-up circuit 407 generates the waking command signal WUP, the start-up signals STA1 and STA2 are generated to activate the microprocessor 400A. The microprocessor 400A performs an event-run based on the self-holding command signal DR0 or the output enabling signal OUTE and stops by itself.

Note that, the voltage dividing resistors 202b and 203b for driving to energize the reverse current interrupting element 200A have a sufficiently large resistance value. Therefore, the start-up signal STA2 and the energization command transistor 207b may be omitted, and one terminal of the voltage dividing resistor 203b may be directly connected to the ground circuit.

Next, a configuration of a power feeding circuit from the power supply switch terminal Vbs of the on-vehicle electronic control device of FIG. 1 is described in detail with reference to FIG. 3 being a detailed circuit diagram thereof.

Figure 3:
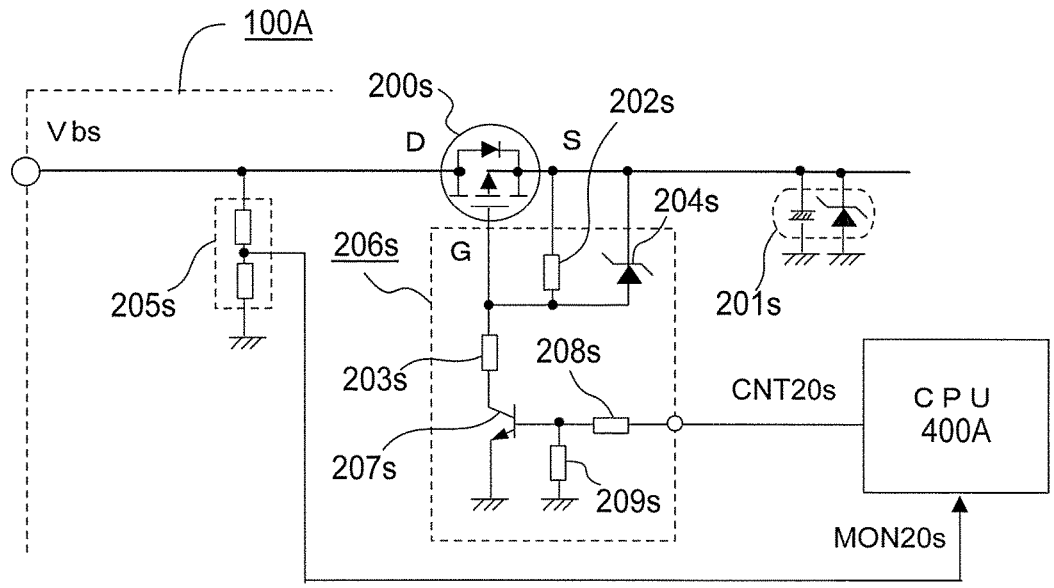
FIG. 3 is a detailed circuit diagram of a power feeding circuit from a power supply switch terminal of each of on-vehicle electronic control devices of FIGS. 1 and 9.

In FIG. 3, the reverse current stop gate circuit 206s connected to a gate terminal G of the reverse current interrupting element 200s includes a voltage dividing resistor 202s connected between a source terminal S and the gate terminal G, and a voltage dividing resistor 203s and an energization command transistor 207s connected in series to each other between the gate terminal G and the ground circuit. When the energization command transistor 207s is closed, a power supply voltage is applied from the power supply switch terminal Vbs via the internal parasitic diode of the reverse current interrupting element 200s to the voltage dividing resistors 202s and 203s. The voltage across the voltage dividing resistor 202s among those resistors is applied between the source terminal and the gate terminal of the reverse current interrupting element 200s.

Note that, a constant voltage diode 204s is connected in parallel to the voltage dividing resistor 202s so as to limit the source/gate voltage from being excessive.

Further, a base terminal of the energization command transistor 207s that is an NPN junction type transistor is driven to be energized by the light load power receiving command signal CNT20s generated by the microprocessor 400A via a base resistor 208s. Further, an open-circuit ballast resistor 209s is connected between the base terminal and an emitter terminal.

The microprocessor 400A reads a monitor voltage of the command monitor signal MON20s that monitors the closed state of the power supply switch 110. When the monitor voltage is increased up to a first predetermined voltage, the microprocessor 400A determines that the power supply switch 110 has been closed to generate the light load power receiving command signal CNT20s, and drives to close the reverse current interrupting element 200s via the reverse current stop gate circuit 206s. On the other hand, when the monitor voltage is reduced to be less than a second predetermined voltage that is a value equal to or less than the first predetermined voltage, the microprocessor 400A determines that the power supply switch 110 is opened to open the reverse current interrupting element 200s.

Next, a configuration of a power feeding circuit from the load power supply terminal Vba of the on-vehicle electronic control device of FIG. 1 is described in detail with reference to FIG. 4 being a detailed circuit diagram thereof.

Figure 4:
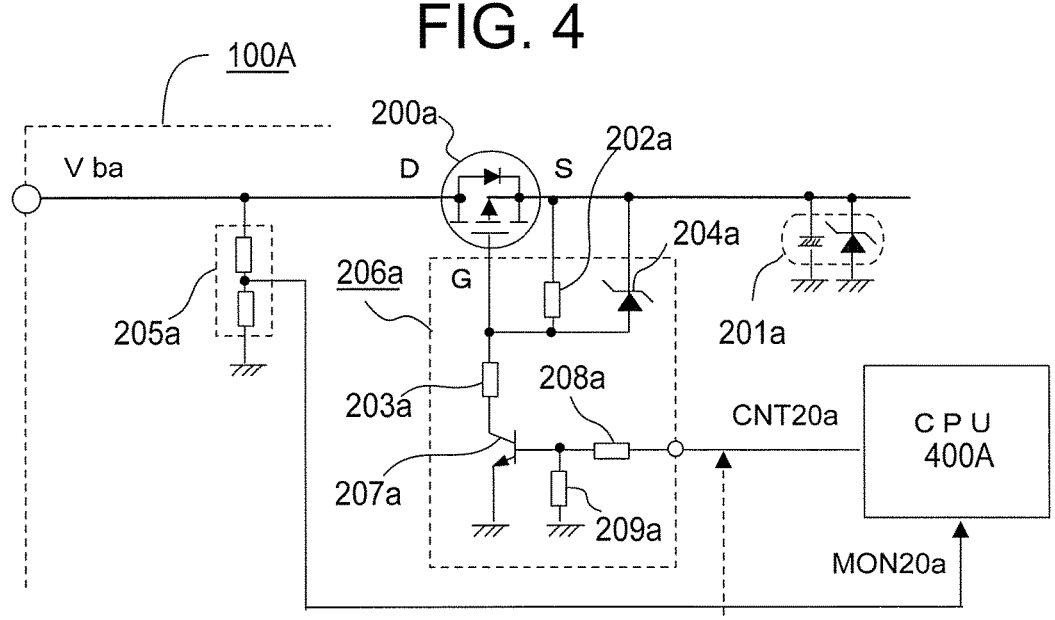
FIG. 4 is a detailed circuit diagram of a power feeding circuit from a load power supply terminal of each of the on-vehicle electronic control devices of FIGS. 1 and 9.
Figure 4:
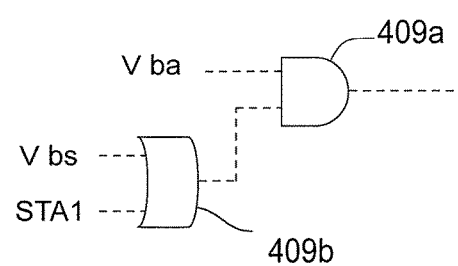

In FIG. 4, the reverse current stop gate circuit 206a connected to a gate terminal G of the reverse current interrupting element 200a includes a voltage dividing resistor 202a connected between a source terminal S and the gate terminal G, and a voltage dividing resistor 203a and an energization command transistor 207a connected in series to each other between the gate terminal G and the ground circuit. When the energization command transistor 207a is closed, a power supply voltage is applied from the load power supply terminal Vba via the internal parasitic diode of the reverse current interrupting element 200a to the voltage dividing resistors 202a and 203a. The voltage across the voltage dividing resistor 202a among those resistors is applied between the source terminal and the gate terminal of the reverse current interrupting element 200a.

Note that, a constant voltage diode 204a is connected in parallel to the voltage dividing resistor 202a so as to limit the source/gate voltage from being excessive.

Further, a base terminal of the energization command transistor 207a that is an NPN junction type transistor is driven to be energized by the load power receiving command signal CNT20a generated by the microprocessor 400A via a base resistor 208a. Further, an open-circuit ballast resistor 209a is connected between the base terminal and an emitter terminal.

The microprocessor 400A determines, as Requirement 1, whether or not the power supply switch 110 is closed and the monitor voltage of the command monitor signal MON20s falls within a predetermined range, monitors, as Requirement 2, whether or not the start-up signal STA1 is generated, and monitors, as Requirement 3, whether or not the monitor voltage of the power receiving monitor signal MON20a falls within a predetermined range. When at least one of Requirement 1 or Requirement 2 is satisfied, and Requirement 3 is satisfied, the load power receiving command signal CNT20a is generated, and the reverse current interrupting element 200a is driven to be closed via the reverse current stop gate circuit 206a. When Requirement 1 and Requirement 2 are not satisfied, even if Requirement 3 is satisfied, the reverse current interrupting element 200a is opened.

An AND circuit 409a and an OR circuit 409b illustrated in the dotted lines are logical configurations of a case where the reverse current stop gate circuit 206a is controlled by a hardware as an alternative to the microprocessor 400A.

The OR circuit 409b inputs logic of whether or not the power supply switch 110 is closed so that a power supply voltage is applied to the power supply switch terminal Vbs as Requirement 1, and receives, as an OR input, logic of whether or not the start-up signal STA1 is generated by the start-up circuit 310A as Requirement 2.

The AND circuit 409a inputs logic of whether or not the feeding switching element 120A is closed and a power supply voltage is applied to the load power supply terminal Vba as Requirement 3, and receives, as an AND input, a logical output of the OR circuit 409b. With the output of the AND circuit 409a, the reverse current interrupting element 200a is driven to be closed via the reverse current stop gate circuit 206a.

Next, a configuration of a switching gate circuit for a light load switching element of the on-vehicle electronic control device of FIG. 1 is described in detail with reference to FIG. 5 being a detailed circuit diagram thereof.

Figure 5:
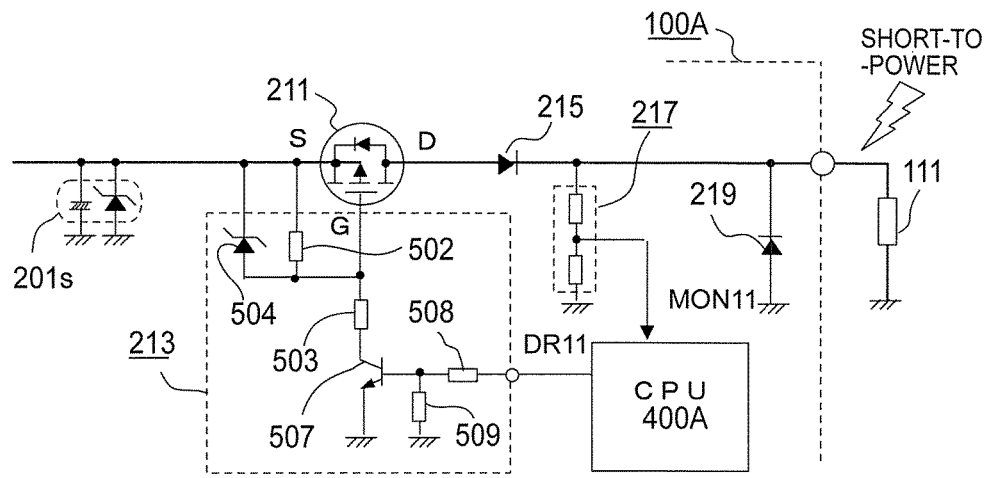
FIG. 5 is a detailed circuit diagram of a switching gate circuit for a light load switching element of each of the on-vehicle electronic control devices of FIGS. 1 and 9.

In FIG. 5, the switching gate circuit 213 connected to a gate terminal G of the light load switching element 211 includes a voltage dividing resistor 502 connected between a source terminal S and the gate terminal G, and a voltage dividing resistor 503 and a drive command transistor 507 connected in series to each other between the gate terminal G and the ground circuit. When the drive command transistor 507 is closed, a power supply voltage is applied from the power supply switch terminal Vbs via the reverse current interrupting element 200s to the voltage dividing resistors 502 and 503. The voltage across the voltage dividing resistor 502 among those resistors is applied between the source terminal and the gate terminal of the light load switching element 211.

Note that, a constant voltage diode 504 is connected in parallel to the voltage dividing resistor 502 so as to limit the source/gate voltage from being excessive.

Further, a base terminal of the drive command transistor 507 that is an NPN junction type transistor is driven to be energized by the light load drive command signal DR11 generated by the microprocessor 400A via a base resistor 508. Further, an open-circuit ballast resistor 509 is connected between the base terminal and an emitter terminal.

A voltage applied from the light load switching element 211 via the reverse current blocking diode 215 to the light load 111 whose drive is to be controlled is divided by the voltage dividing resistor 217 to be input to the microprocessor 400A as the light load voltage monitor signal MON11. The microprocessor 400A determines that there is a risk that a short-to-power abnormality has occurred in the load wiring in a case where the light load voltage monitor signal MON11 is generated even when the light load drive command signal DR11 for closing the light load switching element 211 is not generated.

Note that, a similar phenomenon occurs when the inside of the light load switching element 211 is short-circuited. Therefore, the light load switching element 211 incorporates a current detection element (not shown). When the current detection element detects a load current, it is identified and determined that the abnormality is the short-circuit abnormality of the light load switching element 211.

The same holds true for the switching gate circuit 214 connected to the gate terminal of the light load switching element 212 for driving the light load 112 (see FIG. 1). The switching gate circuit 214 drives to close the light load switching element 212 by the light load drive command signal DR12 generated by the microprocessor 400A.

Further, a voltage applied from the light load switching element 212 via the reverse current blocking diode 216 to the light load 112 whose drive is to be controlled is divided by the voltage dividing resistor 218 to be input to the microprocessor 400A as the light load voltage monitor signal MON12.

Next, a configuration of a switching gate circuit for the load switching element of the on-vehicle electronic control device of FIG. 1 is described in detail with reference to FIG. 6 being a detailed circuit diagram thereof.

Figure 6:
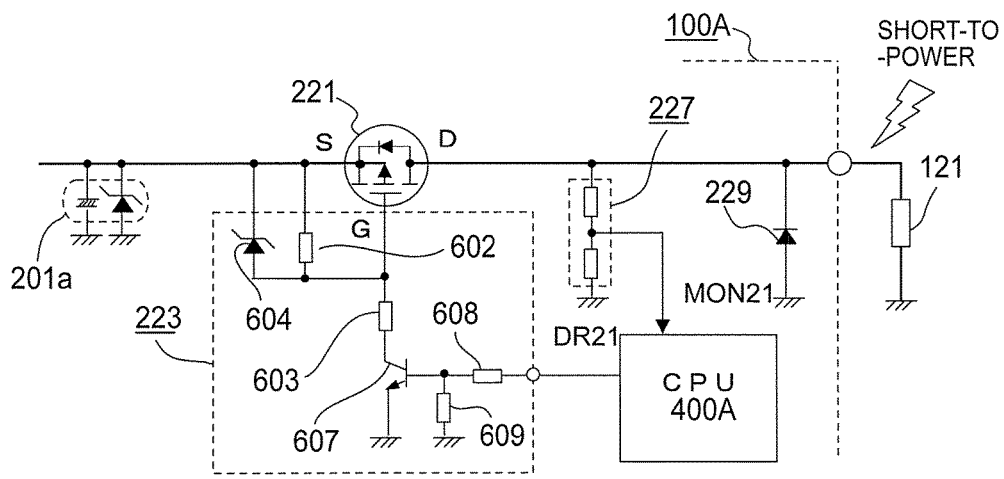
FIG. 6 is a detailed circuit diagram of a switching gate circuit for a load switching element of each of the on-vehicle electronic control devices of FIGS. 1 and 9.

In FIG. 6, the switching gate circuit 223 connected to a gate terminal G of the load switching element 221 includes a voltage dividing resistor 602 connected between a source terminal S and the gate terminal G, and a voltage dividing resistor 603 and a drive command transistor 607 connected in series to each other between the gate terminal G and the ground circuit. When the drive command transistor 607 is closed, a power supply voltage is applied from the load power supply terminal Vba via the reverse current interrupting element 200a to the voltage dividing resistors 602 and 603. A voltage across the voltage dividing resistor 602 among those resistors is applied between the source terminal and the gate terminal of the load switching element 221.

Note that, a constant voltage diode 604 is connected in parallel to the voltage dividing resistor 602 so as to limit the source/gate voltage from being excessive.

Further, a base terminal of the drive command transistor 607 that is an NPN junction type transistor is driven to be energized by a load drive command signal DR21 generated by the microprocessor 400A via a base resistor 608. Further, an open-circuit ballast resistor 609 is connected between the base terminal and an emitter terminal.

A voltage applied from the load switching element 221 to the on-vehicle electrical load 121 whose drive is to be controlled is divided by the voltage dividing resistor 227 to be input to the microprocessor 400A as the load voltage monitor signal MON21. The microprocessor 400A determines that there is a risk that a short-to-power abnormality has occurred in the load wiring in a case where the load voltage monitor signal MON21 is generated even when the load drive command signal DR21 for closing the load switching element 221 is not generated.

Note that, a similar phenomenon occurs when the inside of the load switching element 221 is short-circuited. Therefore, the load switching element 221 incorporates a current detection element (not shown). When the current detection element detects a load current, it is identified and determined that the abnormality is the short-circuit abnormality of the load switching element 221.

The same holds true for the switching gate circuit 224 connected to the gate terminal of the load switching element 222 for driving the on-vehicle electrical load 122 (see FIG. 1). The switching gate circuit 224 drives to close the load switching element 222 by the load drive command signal DR22 generated by the microprocessor 400A.

Further, a voltage applied from the load switching element 222 to the on-vehicle electrical load 122 whose drive is to be controlled is divided by the voltage dividing resistor 228 to be input to the microprocessor 400A as the load voltage monitor signal MON22.

(2) Detailed Description of Action and Operation

Next, the action and operation of the on-vehicle electronic control device according to the first embodiment of the present invention configured as illustrated in FIGS. 1 to 6 are described in detail with reference to a flowchart for describing the operation illustrated in FIGS. 7 and 8.

First, in FIGS. 1 and 2, when the power supply switch 110 is closed, the start-up circuit 310A generates the start-up signals STA1 and STA2. As a result, the reverse current interrupting element 200A is driven to be energized, and the constant voltage power supply 300A generates the control voltage Vcc to activate the microprocessor 400A.

The microprocessor 400A recognizes the closed state of the power supply switch 110 based on the command monitor signal MON20s, and generates the self-holding command signal DR0 or the watchdog signal WDS. In this manner, while maintaining the generation state of the start-up signals STA1 and STA2, the drive of the on-vehicle electrical load group 102 is controlled in response to the operation state of the input sensor group 103 and the content of an input/output control program in the program memory 401A.

When the power supply switch 110 is once closed, the microprocessor 400A further performs a predetermined after-run by an escaping operation program in the program memory 401A after the power supply switch 110 is opened, and then the microprocessor 400A stops the self-holding command signal DR0 or the watchdog signal WDS by itself. Thus, the constant voltage power supply 300A stops the generation of the control voltage Vcc.

Even if the power supply switch 110 is not closed, when the waking start-up circuit 407 illustrated in FIG. 2 generates the waking command signal WUP, the start-up circuit 310A generates the start-up signals STA1 and STA2. As a result, the reverse current interrupting element 200A is driven to be energized, and the constant voltage power supply 300A generates the control voltage Vcc to activate the microprocessor 400A.

The microprocessor 400A recognizes the opened state of the power supply switch 110 based on the command monitor signal MON20s, and recognizes that the waking command signal WUP is generated. Thus, the microprocessor 400A generates the self-holding command signal DR0 or the watchdog signal WDS. In this manner, while maintaining the generation state of the start-up signals STA1 and STA2, the microprocessor 400A performs a predetermined event-run based on a monitoring operation program in the program memory 401A, and then stops the self-holding command signal DR0 or the watchdog signal WDS by itself. Thus, the constant voltage power supply 300A stops the generation of the control voltage Vcc.

When the on-vehicle battery 101 is connected in a reverse polarity as illustrated in the dotted lines of FIG. 1, such a circuit that a negative voltage is less applied to the gate terminals of the reverse current interrupting elements 200A, 200s, and 200a as compared to the source terminals is configured, and hence energization is not achieved between the source terminal and the drain terminal of each of the reverse current interrupting elements 200A, 200s, and 200a.

Therefore, a reverse voltage is not applied to the protective circuit 201b, the constant voltage power supply 300A, or the microprocessor 400A.

Further, even when the power supply switch 110 is closed, a reverse voltage is not applied to the protective circuit 201s.

Further, even when the feeding switching element 120A is a field effect transistor that includes an internal parasitic diode, and when the feeding switching element 120A is in the closed state, a reverse direction current that attempts to pass through the commutation diodes 229 and 220 and the internal parasitic diodes of the load switching elements 221 and 222 is interrupted by the reverse current interrupting element 200a.

Next, a protective operation of a case where the on-vehicle battery 101 is connected in a normal polarity and any one of the on-vehicle electrical loads 121 and 122 has a short-to-power abnormality in the load wiring is described in order.

Note that, in the case of the light loads 111 and 112, the reverse current blocking diodes 215 and 216 are connected in series thereto. Therefore, abnormalities are prevented, such as flowing of a short-to-power current into another light load or through a sneak path into the power supply switch terminal Vbs, which causes generation of the command monitor signal MON20s even when the power supply switch 110 is not closed.

The problematic short-to-power abnormality of the on-vehicle electrical loads 121 and 122 is described of a case where operation/stop is performed by the power supply switch 110.

(A) When Power Supply Switch 110 is Opened and Feeding Switching Element 120A is opened The power supply switch 110 is opened, and hence the reverse current stop gate circuit 206a does not operate. The reverse current interrupting element 200a is opened, and hence a short-to-power current never flows through a sneak path into the load power supply terminal Vba.

Further, the microprocessor 400A is stopped and the load drive command signals DR21 and DR22 are not generated, and hence power is not fed through a sneak path from one on-vehicle electrical load in which the short-to-power abnormality has occurred into the other on-vehicle electrical load in which a short-to-power abnormality has not occurred.

(B) When Power Supply Switch 110 is Closed and Feeding Switching Element 120A is Still Opened Even when the power supply switch 110 is closed, the power receiving monitor signal MON20a is not generated yet, and hence the reverse current stop gate circuit 206a does not operate. The reverse current interrupting element 200a is opened, and hence a short-to-power current does not flow through a sneak path into the load power supply terminal Vba.

Further, if the microprocessor 400A is still stopped, the microprocessor 400A does not generate the load drive command signals DR21 and DR22, and hence power is not fed through a sneak path from one on-vehicle electrical load in which a short-to-power abnormality has occurred into the other on-vehicle electrical load in which a short-to-power abnormality has not occurred. If the operation of the microprocessor 400A starts, by stopping the load drive command signals DR21 and DR22 due to the non-arrival of power, power is not fed through a sneak path similarly.

(C) When Power Supply Switch 110 is Closed and Feeding Switching Element 120A is opened A power supply voltage is applied to the load power supply terminal Vba, and hence even when the reverse current interrupting element 200a is closed, a short-to-power current does not flow through a sneak path into the load power supply terminal Vba. Further, if the operation of the microprocessor 400A starts, a short-to-power abnormality is detected, and hence by stopping the generation of the load drive command signals DR21 and DR22, power is not fed through a sneak path from one on-vehicle electrical load in which a short-to-power abnormality has occurred into the other on-vehicle electrical load in which a short-to-power abnormality has not occurred. Even when the generation of the load drive command signals DR21 and DR22 is not stopped, a short-to-power current that is caused by the difference of the voltage drop between the power supply line on the normal side and the power supply line on the short-to-power side has a small value, and hence an actual damage that spreads to others is small.

(D) Abnormal State in which Power Supply Switch 110 is Closed and Feeding Switching Element 120A is Opened from Closed State The microprocessor 400A detects the short-to-power abnormality so as to open the reverse current interrupting element 200a, and hence a short-to-power current does not flow through a sneak path into the load power supply terminal Vba.

Further, the microprocessor 400A detects the short-to-power abnormality so as to stop the load drive command signals DR21 and DR22, and hence power is not fed through a sneak path from one on-vehicle electrical load in which a short-to-power abnormality has occurred into the other on-vehicle electrical load in which a short-to-power abnormality has not occurred.

Therefore, assuming a double abnormality in which such an abnormal state that the feeding switching element 120A is opened from the closed state even when the power supply switch 110 is closed occurs and further the short-to-power abnormality occurs in the load wiring, the short-to-power abnormality detection is meaningful, but the original advantage of detecting the short-to-power abnormality is to store the abnormality occurrence history and facilitate the maintenance and inspection.

(E) When Power Supply Switch 110 is Opened and Feeding Switching Element 120A is Still Closed A power supply voltage is applied to the load power supply terminal Vba, and hence even when the reverse current interrupting element 200a is closed, a short-to-power current does not flow through a sneak path into the load power supply terminal Vba. However, if the power supply switch 110 is opened when the microprocessor 400A is operating, the reverse current interrupting element 200a is opened.

Further, when the microprocessor 400A detects the short-to-power abnormality so as to stop the load drive command signals DR21 and DR22, power is not fed through a sneak path from one on-vehicle electrical load in which a short-to-power abnormality has occurred into the other on-vehicle electrical load in which a short-to-power abnormality has not occurred. Even when the generation of the load drive command signals DR21 and DR22 is not stopped, a short-to-power current that is caused by the difference of the voltage drop between the power supply line on the normal side and the power supply line on the short-to-power side has a small value, and hence an actual damage that spreads to others is small.

Further, when the microprocessor 400A stops, the load drive command signals DR21 and DR22 also stop, and hence power is not fed through a sneak path similarly.

Next, the action and operation of the on-vehicle electronic control device of FIG. 1 are described in detail with reference to FIG. 7 being a first flowchart and FIG. 8 being a latter flowchart for describing the operation thereof.

Figure 7:
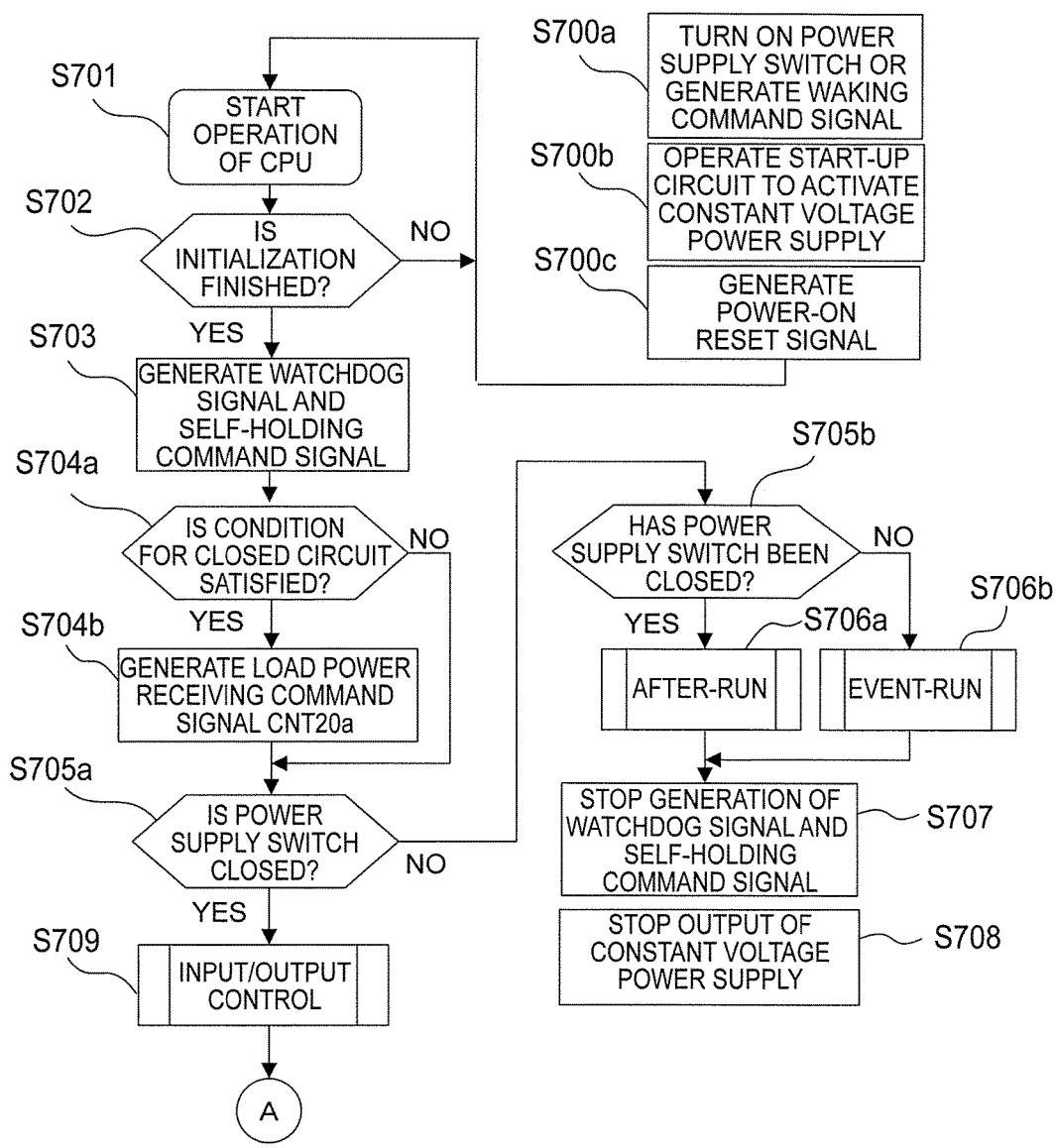
FIG. 7 is a first flow chart for describing the operation of the on-vehicle electronic control device of FIG. 1.

In FIG. 7, Step S700a is a step of manually closing the power supply switch 110 or generating the waking command signal WUP by the waking start-up circuit 407.

Subsequent Step S700b is a step of generating the start-up signals STA1 and STA2 by the start-up circuit 310A so that the reverse current interrupting element 200A is driven to be closed and the constant voltage power supply 300A is activated to generate the control voltage Vcc.

Subsequent Step S700c is a step of generating a power-on reset signal by a power-on reset circuit (not shown) to initialize the microprocessor 400A.

Subsequent Step S701 is a step of starting the control operation by the microprocessor (CPU) 400A.

Subsequent Step S702 is a determination step of reading the state of an initialization finished flag, in which determination of YES is made when the initialization is finished so that the process proceeds to Step S703, and determination of No is made when the initialization is not finished yet and the process returns to Step S701.

Step S703 is a step of generating the watchdog signal WDS and the self-holding command signal DR0. When the watchdog timer 406 generates the output enabling signal OUTE, generation of the self-holding command signal DR0 is unnecessary.

Subsequent Step S704a is a determination step of determining whether or not the requirements for generating the load power receiving command signal CNT20a for the reverse current interrupting element 200a are satisfied, in which determination of YES is made when the requirements are satisfied so that the process proceeds to Step S704b, and determination of No is made when the requirements are not satisfied so that the process proceeds to Step S705a.

Note that, as the requirements for determination in Step S704a, it is necessary to satisfy at least one of Requirement 1 (closure of power supply switch 110) or Requirement 2 (generation of start-up signal STA1) described above, and also satisfy Requirement 3 (power reception of load power supply terminal Vba).

It should be noted that, if a short-to-power abnormality occurs in the load wiring, when the feeding switching element 120A is once closed and opened thereafter, a short-to-power current flows through a sneak path into the load power supply terminal Vba via the reverse current interrupting element 200a, and hence the feeding switching element 120A appears to be in the same state as the closed state.

Step S704b is a step of generating the load power receiving command signal CNT20a and then proceeding to Step S705a.

Step S705a is a determination step of reconfirming whether or not the power supply switch 110 is closed, in which determination of YES is made when the power supply switch 110 is closed so that the process proceeds to Step Block S709, and determination of No is made when the power supply switch 110 is opened so that the process proceeds to Step S705b.

Note that, in Step S705a, the microprocessor 400A reads the monitor voltage of the command monitor signal MON20s for monitoring the closed state of the power supply switch 110. When the monitor voltage is increased up to the first predetermined voltage, it is determined that the power supply switch 110 is closed, and when the monitor voltage is reduced to be less than the second predetermined voltage that is a value equal to or less than the first predetermined voltage, it is determined that the power supply switch 110 is opened.

Figure 8:
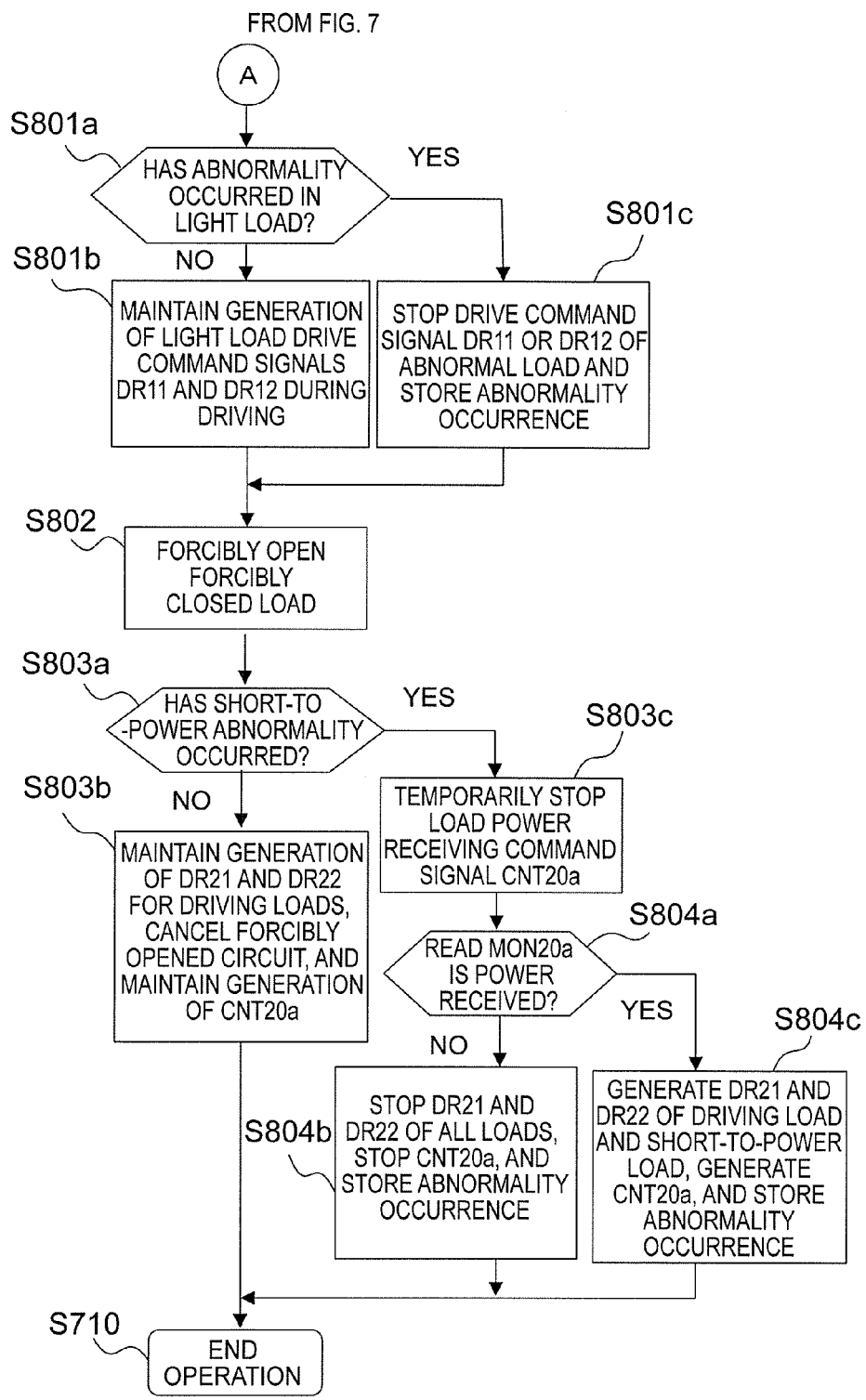
FIG. 8 is a latter flow chart for describing the operation of the on-vehicle electronic control device of FIG. 1.

Step Block S709 is a step of controlling drive of the on-vehicle electrical load group 102 in response to the operation state of the input sensor group 103 and the content of the input/output control program stored in the program memory 401A, generating the light load drive command signals DR11 and DR12 and the load drive command signals DR21 and DR22 at appropriate timings, and proceeding to Step S801a of FIG. 8.

Step S705b is a determination step that is executed when it is determined that the power supply switch 110 is opened in Step S705a. Step S705b is a determination step of reading a state of a flag (not shown) for storing the fact that the power supply switch 110 is closed, and determining whether or not the power supply switch 110 has been ever closed, in which determination of YES is made when there is a closed history so that the process proceeds to Step Block S706a, and determination of No is made when there is no closed history so that the process proceeds to Step Block S706b.

Step Block S706a is a step of performing a short-period after-run based on the escaping operation program stored in the program memory 401A. In this case, abnormality occurrence information and learning information written into the RAM memory 403 during operation are transported and written into the non-volatile data memory 402.

Step Block S706b is a step of performing a short-period event-run based on the monitoring operation program stored in the program memory 401A. In this case, an operation state of a specific sensor among the input sensor group 103 is read to be written and stored into the RAM memory 403 or the data memory 402.

Step S707 executed subsequent to Step Block S706a or Step Block S706b is a step of stopping generation of the self-holding command signal DR0 or the watchdog signal WDS that has been generated or started to be generated in Step S703.

In Step S708, by stopping the start-up signals STA1 and STA2 by the start-up circuit 310A, the constant voltage power supply 300A stops the generation of the control voltage Vcc so as to interrupt power fed to the microprocessor 400A and open the reverse current interrupting element 200A.

Note that, it is also possible to omit the start-up signal STA2 and maintain the reverse current interrupting element 200A in an energized state.

In FIG. 8, Step S801a is a determination step of determining whether or not a short-to-power abnormality has occurred in any of the plurality of light loads 111 and 112, in which determination of NO is made when no abnormality has occurred so that the process proceeds to Step S801b, and determination of YES is made when abnormality has occurred so that the process proceeds to Step S801c.

Note that, in Step S801a, by reading a generation or non-generation state of the light load drive command signals DR11 and DR12 for the plurality of light loads 111 and 112 in Step Block S709 of FIG. 7, and reading the light load voltage monitor signals MON11 and MON12, it is determined that a short-to-power abnormality has occurred in the load wiring of the light loads 111 and 112 in a case where the monitor voltages of the light load voltage monitor signals MON11 and MON12 are generated even when the light load drive command signals DR11 and DR12 are not generated.

Step S801b is a step of maintaining the generation of the light load drive command signals DR11 and DR12 for the driving light loads 111 and 112 and proceeding to Step S802.

Step S801c is a step of inhibiting further generation of the light load drive command signal DR11 or DR12 for the light load 111 or 112 that has determined that abnormality has occurred, writing and storing short-to-power abnormality occurrence information into the RAM memory 403, and proceeding to Step S802.

Note that, in Step S801a, when a monitor voltage is not generated by the light load voltage monitor signals MON11 and MON12 even if the light load drive command signals DR11 and DR12 are generated, it is determined that disconnection abnormality has occurred in the light load switching elements 211 and 212, and disconnection abnormality occurrence information is written into the RAM memory 403 in Step S801c.

Step S802 is a step of forcibly opening the load switching element forcibly closed in Step S804c described later and proceeding to Step S803a. "Forcibly close" and "forcibly open" refer to achieving the closed circuit and the opened circuit by the load drive command signal independent of the result calculated and determined in Step Block S709.

Step S803a is a determination step of determining whether or not a short-to-power abnormality has occurred in any of the plurality of on-vehicle electrical loads 121 and 122, in which determination of NO is made when no abnormality has occurred so that the process proceeds to Step S803b, and determination of YES is made when abnormality has occurred so that the process proceeds to Step S803c.

Note that, in Step S803a, by reading a generation or non-generation state of the load drive command signals DR21 and DR22 for the plurality of on-vehicle electrical loads 121 and 122 in Step Block S709 of FIG. 7, and reading the load voltage monitor signals MON21 and MON22, it is determined that a short-circuit abnormality has occurred in the load wiring of the on-vehicle electrical loads 121 and 122 in a case where the monitor voltages of the load voltage monitor signals MON21 and MON22 are generated even when the load drive command signals DR21 and DR22 are not generated.

Step S803b is a step of maintaining generation of the load drive command signals DR21 and DR22 for the driving on-vehicle electrical loads 121 and 122, canceling the forcibly opened state obtained in Step S802, and proceeding to Operation End Step S710.

Step S803c is a step of stopping the load power receiving command signal CNT20a and then proceeding to Step S804a.

Step S804a is a step of reading the power receiving monitor signal MON20a and determining whether or not a power supply voltage is applied to the load power supply terminal Vba. At this time, the reverse current interrupting element 200a is interrupted in Step S803c, and hence independent of the presence/absence of the short-to-power abnormality, it is determined whether or not the feeding switching element 120A is closed in Step S804a. When the feeding switching element 120A is opened and power is not received, determination of NO is made so that the process proceeds to Step S804b, and when the feeding switching element 120A is closed and power is received, determination of YES is made so that the process proceeds to Step S804c.

Step S804b is a step of stopping generation of the load drive command signals DR21 and DR22 to all of the on-vehicle electrical loads 121 and 122, stopping the load power receiving command signal CNT20a, writing and storing the short-to-power abnormality occurrence information into the RAM memory 403, and proceeding to Operation End Step S710.

With this, a short-to-power current is prevented from flowing into the load power supply terminal Vba, and power is prevented from being fed through a sneak path into the on-vehicle electrical load in which the short-to-power abnormality has not occurred.

Step S804c is a step of forcibly closing the load switching element for the on-vehicle electrical load in which the short-to-power abnormality has occurred, maintaining the load switching element for the on-vehicle electrical load in which the short-to-power abnormality has not occurred in an opened/closed state calculated and set in Step Block S709, recovering and generating the load power receiving command signal CNT20a stopped in Step S803c, writing and storing the short-to-power abnormality occurrence information into the RAM memory 403, and proceeding to Operation End Step S710.

Note that, in Step S803a, when the monitor voltages are not generated by the load voltage monitor signals MON21 and MON22 even if the load drive command signals DR21 and DR22 are generated, it is determined that the load switching elements 221 and 222 have a disconnection abnormality, and the disconnection abnormality occurrence information is written into the RAM memory 403 in Step S804c.

Further, in Step S804c, the load switching element in which the short-to-power abnormality has occurred is forcibly closed so as to prevent power from being fed through a sneak path from the short-to-power power supply via the internal parasitic diode of the load switching element into the other on-vehicle electrical load and prevent the internal parasitic diode from burning out.

In Operation End Step S710, another control program is executed, and within a predetermined time period of 5 ms, for example, the process returns to Operation Start Step S701 of FIG. 7 so as to repetitively execute the process flow from Operation Start Step S701 to Operation End Step S710.

In the above description, the short-to-power abnormality in the load wiring is mainly described, but when a short-to-ground abnormality in which the load wiring is abnormally brought into contact with the ground circuit GND occurs, the short-circuit current is immediately interrupted by an overcurrent interrupting function provided to the load switching elements 221 and 222 and the light load switching elements 211 and 212. This state is input in an interrupted manner to the microprocessor 400A so as to stop the drive signal for the corresponding switching element by the microprocessor 400A.

In the above description, P-channel field effect transistors are used for the reverse current interrupting elements 200A, 200s, and 200a, the light load switching elements 211 and 212, and the load switching elements 221 and 222 so as to be connected at upstream positions of the power supply circuit. However, as described later with reference to FIGS. 11 and 12, the P-channel field effect transistors may be replaced with N-channel field effect transistors, and switching may be controlled at downstream positions of the load.

(3) Main Point and Feature of First Embodiment

As is apparent from the above description, the on-vehicle electronic control device 100A according to the first embodiment of the present invention includes: the microprocessor 400A for controlling the drive of the plurality of on-vehicle electrical loads 121 and 122 via the plurality of load switching elements 221 and 222 in response to the operation state of the input sensor group 103 and the content of the cooperating program memory 401A; and the constant voltage power supply 300A that is fed power from the on-vehicle battery 101 so as to supply the predetermined stable control voltage Vcc to the microprocessor. The microprocessor 400A is configured to start the control operation when the power supply switch 110 is closed, perform the predetermined after-run based on one of the self-holding command signal DR0 and the output enabling signal OUTE even when the power supply switch is opened after the power supply switch 110 is once closed, and then stop by itself.

The constant voltage power supply 300A is configured to be fed power from the control power supply terminal Vbb that is directly connected to the on-vehicle battery 101 via the reverse current interrupting element 200A for a power supply circuit, and start generation of the predetermined stable control voltage Vcc based on the start-up signal STA1 generated by the start-up circuit 310A in response to the operation of the power supply switch 110.

The start-up circuit 310A is configured to generate the start-up signal STA1 when the power supply switch 110 is closed, and maintain, when the power supply switch 110 is closed, generation of the start-up signal STA1 until the predetermined after-run is finished even when the power supply switch is opened.

Each of the plurality of on-vehicle electrical loads 121 and 122 is fed power to be driven from the load power supply terminal Vba, which is connected to the on-vehicle battery 101 via the feeding switching element 120A that enters a closed state at least when the power supply switch 110 is closed, via the series circuit including the reverse current interrupting element 200a for a load circuit and corresponding one of the plurality of load switching elements 221 and 222.

Further, as at least a part of the plurality of load switching elements 221 and 222, the field effect transistor is used, which is connected in such a polarity that, when being driven to be energized by the microprocessor 400A, a drive current for any one of the plurality of on-vehicle electrical loads 121 and 122 flows in an opposite direction to the energization direction of the internal parasitic diode of the field effect transistor.

As the reverse current interrupting element 200A for a power supply circuit, the field effect transistor is used, which is connected in such a manner that, when the on-vehicle battery 101 is connected in a normal polarity, the field effect transistor is driven to be energized in the same direction as an internal parasitic diode of the field effect transistor so as to feed power to the constant voltage power supply 300A, and when the on-vehicle battery 101 is connected in an abnormal reverse polarity, the gate voltage becomes a reverse polarity so as to stop the drive for the energization.

As the reverse current interrupting element 200a for a load circuit, the field effect transistor is used, which is connected in such a relationship that, in a case where the on-vehicle battery 101 is connected in the normal polarity when the load current flows, the load current for the plurality of on-vehicle electrical loads 121 and 122 flows in the same direction as the energization direction of the internal parasitic diode of the field effect transistor, and in a case where the on-vehicle battery 101 is connected in the abnormal reverse polarity, the gate voltage becomes the reverse polarity to interrupt the load current. The reverse current interrupting element 200a for a load circuit is configured to interrupt the energization when the on-vehicle battery 101 is connected in the abnormal reverse polarity.

Further, the reverse current interrupting element 200a for a load circuit is driven to be closed when one of a state in which the power supply switch 110 is closed and a state in which the start-up signal STA1 is generated is achieved, and when a state in which the normal polarity power supply voltage is applied to the load power supply terminal Vba is achieved. The reverse current interrupting element 200a for a load circuit is opened one of when the power supply switch 110 is opened and when the generation of the start-up signal STA1 is stopped in a case where the short-to-power abnormality in which the load wiring is abnormally brought into contact with positive wiring of the on-vehicle battery 101 occurs, to thereby prevent the short-to-power current from flowing through a sneak path into the load power supply terminal Vba at least when the feeding switching element 120A is in an opened state.

The control power supply terminal Vbb connected to the on-vehicle battery 101 is connected to the protective circuit 201b including at least one of the polar capacitor or the constant voltage diode for surge absorption.

The reverse current interrupting element 200A for a power supply circuit is connected between the control power supply terminal Vbb and the protective circuit 201b.

The description above relates to claim 2 of the present invention. The control power supply terminal connected to the on-vehicle battery is connected to the protective circuit that is the polar capacitor or the constant voltage diode for surge absorption via the reverse current interrupting element.

Therefore, the following features are provided. When the on-vehicle battery is connected in an improper polarity, damage on not only the constant voltage power supply but also the protective circuit is prevented, and the polar capacitor can be freely charged/discharged when the on-vehicle battery is connected in a normal polarity.

The constant voltage power supply 300A is further configured to generate the predetermined stable control voltage Vcc for driving the microprocessor 400A, and the backup voltage Vup for feeding power to the cooperating RAM memory 403 when the microprocessor 400A is stopped.

The reverse current stop gate circuit 206b drives to energize the reverse current interrupting element 200A for a power supply circuit based on the same start-up signal STA2 as the start-up signal STA1 for the constant voltage power supply 300A.

The description above relates to claim 3 of the present invention. The reverse current interrupting element for a power supply circuit is driven to be closed in association with the generation of the output of the constant voltage power supply.

Therefore, the following features are provided. When power is fed to the microprocessor, the reverse current interrupting element is energized. Therefore, a current does not flow through the internal parasitic diode having a large voltage drop, and the temperature rise of the reverse current interrupting element is small. When the microprocessor is stopped, the current flowing through the internal parasitic diode is a minute current for backup, and hence the temperature rise is small. In addition, the gate circuit is interrupted, and hence an unnecessary dark current does not flow, which enables reduction of power consumption.

The start-up circuit 310A is further configured to generate the feeding start signal STA1 when the waking start-up circuit 407 that is fed power from the control power supply terminal Vbb directly connected to the on-vehicle battery 101 generates a waking start-up signal WUP even if the power supply switch 110 is not closed.

The waking start-up circuit 407 is one of:
  a timer circuit for generating an end-of-time signal that is the waking command signal WUP when an opened period of the power supply switch 110 has elapsed for the predetermined period; and
  the communication circuit for generating the waking command signal WUP received from the host station via the communication line.

The microprocessor 400A is further configured to one of generate the self-holding command signal DR0 and generate the watchdog signal WDS to be output to the watchdog timer 406 when the constant voltage power supply 300A generates the predetermined stable control voltage Vcc based on the waking command signal WUP so as to activate the microprocessor 400A, the watchdog timer 406 generating the output enabling signal OUTE when the signal pulse width of the watchdog signal WDS is less than the predetermined value.

The microprocessor 400A is further configured to one of write a time period from the predetermined event-run to a next waking activation to the waking start-up circuit 407 and transmit the time period to the host station via the communication line, and then stop generation of one of the self-holding command signal DR0 and the watchdog signal WDS.

The description above relates to claim 7 of the present invention. Even when the power supply switch is not manually closed, the microprocessor is waked and activated by the waking start-up circuit. Thus, a power feeding circuit configuration capable of automatically transforming to a power fed state is obtained.

Therefore, the following features are provided. In a parked vehicle, the state of an input sensor may be periodically monitored to be stored, and an event-run such as determining and storing the presence/absence of abnormality may be automatically performed.

The microprocessor 400A is further configured to one of:
  drive to close the reverse current interrupting element 200a for a load circuit via the reverse current stop gate circuit 206a by reading a monitor voltage of the command monitor signal MON20s for monitoring the closed state of the power supply switch 110 and the monitor voltage of the power receiving monitor signal MON20a for monitoring the closed state of the feeding switching element 120A when both of the monitor voltages have the predetermined value or more, and interrupt, after the reverse current interrupting element 200a for a load circuit is once driven to be closed, the gate circuit in the reverse current stop gate circuit 206a with respect to the reverse current interrupting element 200a for a load circuit when the power supply switch 110 is opened; and
  drive to close the reverse current interrupting element 200a for a load circuit when the feeding start signal STA1 is generated and the monitor voltage of the power receiving monitor signal MON20a is equal to or more than the predetermined voltage even if the power supply switch 110 is not closed, and open, after the reverse current interrupting element 200a for a load circuit is once driven to be closed, the reverse current interrupting element 200a for a load circuit when the feeding start signal STA1 is stopped.

The description above relates to claim 8 of the present invention. The energization of the reverse current interrupting element for a load circuit is controlled by the microprocessor. When the power supply switch is in the closed state or when the microprocessor is in an event-run state by the waking start-up circuit, if a power supply voltage is applied to the load power supply terminal, the reverse current interrupting element for a load circuit is driven to be closed.

Therefore, the following features are provided. The energization of the reverse current interrupting element for a load circuit is controlled by the normal operation of the microprocessor. When the microprocessor is stopped, the energization of the reverse current interrupting element is stopped. Therefore, a short-to-power current does not flow through a sneak path into a load drive terminal. When the microprocessor is stopped, the load drive command signal is also stopped. Therefore, feeding of power through a sneak path into the on-vehicle electrical load in which a short-to-power abnormality has not occurred is also stopped.

The microprocessor 400A and the cooperating program memory 401A incorporate a control program that is short-to-power abnormality detection section.

The short-to-power abnormality detection section is configured to compare logic states of load drive command signals DR21 and DR22 for the plurality of load switching elements 221 and 222 with signal voltage levels of the load voltage monitor signals MON21 and MON22 that are proportional to output voltages of the plurality of load switching elements 221 and 222, and determine that there is a risk of occurrence of the short-to-power abnormality when the load voltage monitor signals MON21 and MON22 are generated even if the plurality of load switching elements 221 and 222 are opened.

The microprocessor 400A is further configured to open all of the plurality of load switching elements 221 and 222 and the reverse current interrupting element 200a for a load circuit when at least the feeding switching element 120A is opened in a case where the short-to-power abnormality detection section determines that there is the risk of the short-to-power abnormality.

The description above relates to claim 9 of the present invention. The microprocessor is configured to open all of the load switching elements and the reverse current interrupting element for a load circuit when at least the feeding switching element is opened in a case where the short-to-power abnormality detection section determines that there is the risk of the short-to-power abnormality.

Therefore, the following features are provided. In a case where the feeding switching element is forcibly opened even when the power supply switch is not opened along with the occurrence of the short-to-power abnormality, the short-to-power power is prevented from flowing through a sneak path into the load power supply terminal so as to be fed to the constant voltage power supply, and the combined on-vehicle electronic control device is prevented from malfunctioning.

In the on-vehicle electrical load group 102, the light loads 111 and 112 represented by an exciting coil of a load power supply relay having a small energization current are controlled to be driven from the power supply switch 110 via the series circuit including the light load switching elements 211 and 222 and the reverse current blocking diodes 215 and 216.

The description above relates to claim 10 of the present invention. Among the plurality of on-vehicle electrical loads, the light load can be driven from the power supply switch via the light load switching element and the reverse current blocking diode.

Therefore, the following features are provided. Load circuits of a specific group can configure a single power supply circuit by using a load relay driven from the power supply switch without depending on the feeding switching element. Further, even when a short-circuit abnormality occurs in the light load, there is no risk of reverse flow to the power supply switch side due to the blocking by the reverse current blocking diode, and it is possible to prevent false recognition that the power supply switch is closed due to the short-to-power power even if the power supply switch is opened.

The power supply switch terminal Vbs, which is connected to the on-vehicle battery 101 via the power supply switch 110, is connected to the protective circuit 201s including at least one of the polar capacitor or the constant voltage diode for surge absorption.

The power supply switch terminal Vbs and the protective circuit 201s have the reverse current interrupting element 200s for a protective circuit connected therebetween.

The microprocessor 400A is further configured to:
determine that the power supply switch 110 is closed by reading the monitor voltage of the command monitor signal MON20s for monitoring the closed state of the power supply switch 110 when the monitor voltage is increased up to the first predetermined voltage, and drive to close the reverse current interrupting element 200s for a protective circuit via the reverse current stop gate circuit 206s; and
determine that the power supply switch 110 is opened when the monitor voltage is reduced to be less than the second predetermined voltage that is the value equal to or less than the first predetermined voltage, and open the reverse current interrupting element 200s for a protective circuit.

The start-up circuit 310A is configured in a state that enables generation of the feeding start signal STA1 when the power supply switch 110 is closed and a voltage equal to or more than the third predetermined voltage that is a voltage further lower than the second predetermined voltage is applied to the start-up circuit 310A.

The description above relates to claim 11 of the present invention. The power supply switch terminal, which is connected to the on-vehicle battery via the power supply switch, is connected to the protective circuit that is the polar capacitor or the constant voltage diode for surge absorption via the reverse current interrupting element. Further, the microprocessor is configured to monitor the voltage of the power supply switch terminal, determine the opened/closed state of the power supply switch, and control the energization of the reverse current interrupting element for a protective circuit.

Therefore, the following features are provided. When the on-vehicle battery is connected in an improper polarity, the protective circuit can be prevented from being damaged, and when the on-vehicle battery is connected in a normal polarity, the polar capacitor can be freely charged/discharged.

Further, when the output voltage of the on-vehicle battery is abnormally reduced, the microprocessor can determine the opened/closed state of the power supply switch during a period in which the constant voltage power supply generates the predetermined control voltage. Further, the reverse current interrupting element is opened after the polar capacitor in the protective circuit is discharged so as to have a voltage equal to or less than the second predetermined voltage. Further, a hysteresis characteristic may be provided to a determination level. Thus, false determination due to the noise voltage can be prevented.

Second Embodiment (1) Detailed Description of Configuration

Now, a configuration of an on-vehicle electronic control device according to a second embodiment of the present invention is described in detail with reference to FIG. 9 being an overall circuit diagram thereof mainly on points different from those in FIG. 1.

Figure 9:
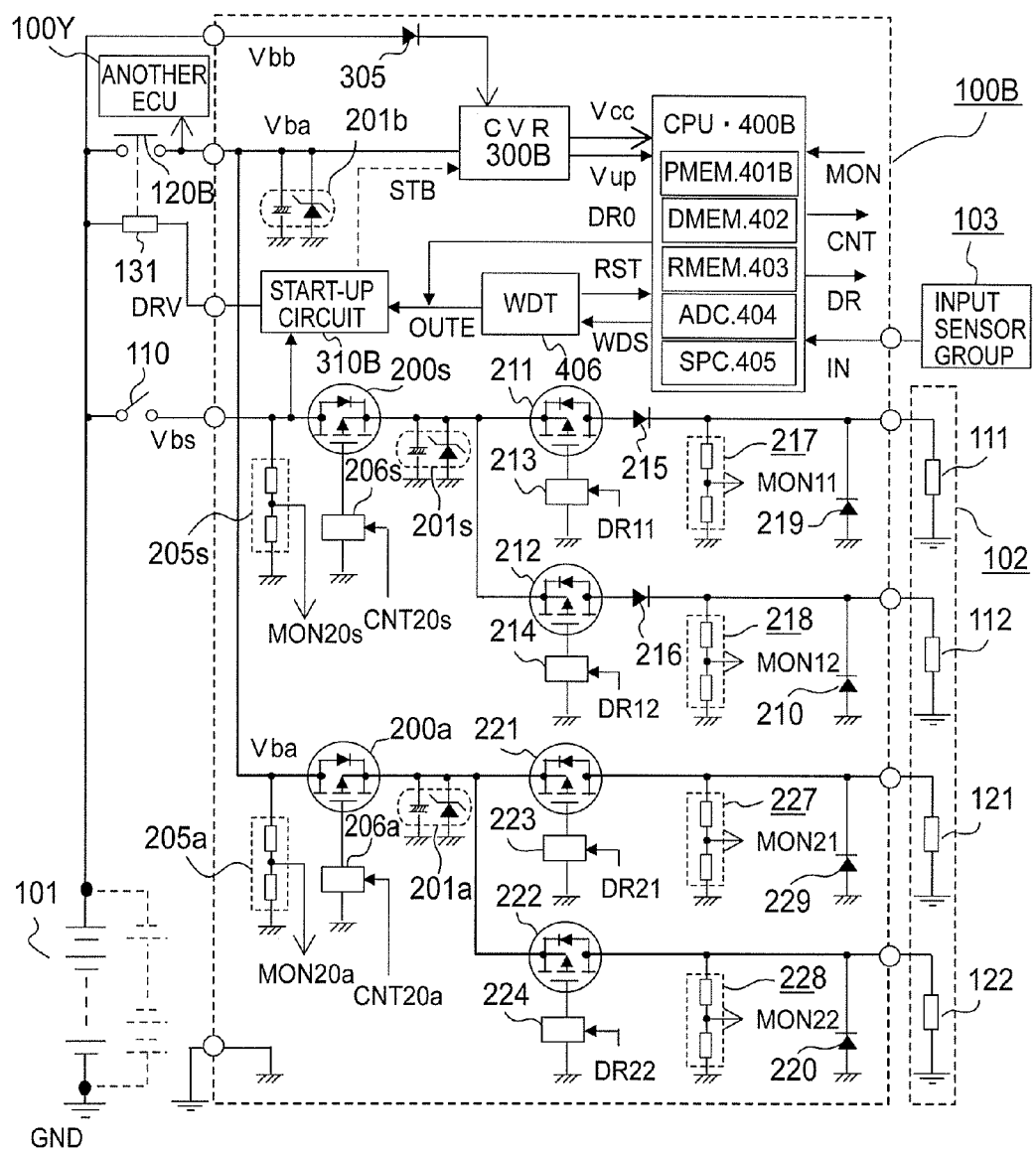
FIG. 9 is an overall circuit diagram of an on-vehicle electronic control device according to a second embodiment of the present invention.

The on-vehicle electronic control device of FIG. 9 mainly differs from the on-vehicle electronic control device of FIG. 1 in that a constant voltage power supply 300B is fed power from the load power supply terminal Vba to generate the control voltage Vcc, and the backup voltage Vup is supplied from the control power supply terminal Vbb connected to the on-vehicle battery 101 via a reverse connection protecting diode 305.

In FIG. 9, an on-vehicle electronic control device 100B includes the control power supply terminal Vbb that is directly connected to the positive terminal of the on-vehicle battery 101 via a fuse (not shown), the load power supply terminal Vba connected to the positive terminal of the on-vehicle battery 101 via a feeding switching element 120B, the ground terminal connected to the ground circuit GND that is the vehicle body connected to the negative terminal of the on-vehicle battery 101, and the power supply switch terminal Vbs connected to the positive terminal of the on-vehicle battery 101 via the manual power supply switch 110 that is an ignition switch, for example.

The feeding switching element 120B is, for example, an output contact of an electromagnetic relay including the exciting coil 131, and the electromagnetic relay is unidirectionally energized by an exciting circuit 310B described later. When the power supply switch 110 is closed and the connection polarity of the on-vehicle battery 101 is correct, the output contact 120B is closed, and when the connection polarity is improper, the output contact is not closed.

Note that, when the on-vehicle electronic control device 100B is, for example, an engine control device, the feeding switching element 120B may also feed power to, for example, a combined on-vehicle electronic control device 100Y (another ECU 100Y) that is a transmission control device.

Further, as the feeding switching element 120B, instead of the above-mentioned electromagnetic relay (actually, the feeding switching element 120B and the exciting coil 131), there may be employed a non-contact switching element in which a pair of field effect transistors are connected in series so that the energization directions of internal parasitic diodes thereof are opposite to each other, to thereby provide a reverse connection protecting function and a switching element function.

Similarly to FIG. 1, in the on-vehicle electrical load group 102, the plurality of light loads 111 and 112 are the loads as represented by the exciting coil of the electromagnetic relay and the indicator for abnormality alarm. The light loads 111 and 112 are connected to the on-vehicle electronic control device 100B via the light load drive terminals.

Similarly to FIG. 1, in the on-vehicle electrical load group 102, the plurality of on-vehicle electrical loads 121 and 122 are motors or solenoid coils for driving a solenoid valve, and are connected to the on-vehicle electronic control device 100B via the load drive terminals.

Similarly to FIG. 1, the input sensor group 103 that is the switching sensor or the analog sensor is connected to an input terminal of the on-vehicle electronic control device 100B so as to be connected to a microprocessor 400B described later via the input interface circuit (not shown).

Power is fed to the constant voltage power supply 300B (CVR 300B) provided inside the on-vehicle electronic control device 100B from the control power supply terminal Vbb connected to the on-vehicle battery 101 via the reverse connection protective diode 305. The constant voltage power supply 300B always generates the backup voltage Vup, and a battery voltage that varies in a range of 7 V to 16 V in a normal state is applied to the constant voltage power supply 300B from the load power supply terminal Vba. Thus, the constant voltage power supply 300B generates the stable control voltage Vcc that is supplied to the microprocessor 400B.

Similarly to FIG. 1, between a power supply input terminal of the constant voltage power supply 300B and the ground circuit, the protective circuit 201b including one or both of, for example, the polar capacitor that is the electrolytic capacitor and the voltage limiting diode that is the constant voltage diode is connected so as to prevent entrance of a high-voltage noise generated at the external power supply line.

Note that, the constant voltage power supply 300B may be configured to immediately generate the control voltage Vcc when a power supply voltage is input to a power supply input terminal thereof, or configured to generate the control voltage Vcc when the start-up circuit 310B described later with reference to FIG. 10 generates a start-up signal STB, and the start-up signal STB is input to a start-up terminal of the constant voltage power supply 300B.

Note that, the backup voltage Vup for feeding power to the RAM memory 403 that cooperates with the microprocessor 400B is always generated independently of the start-up signal STB.

Similarly to FIG. 1, the microprocessor 400B incorporates a non-volatile program memory 401B that is a flash memory, for example, the non-volatile data memory (DMEM) 402 that is a partial region of the program memory 401B or that can easily perform electrical reading and writing, the RAM memory (RMEM) 403 that is a volatile memory for arithmetic processing, the multi-channel AD converter (ADC) 404, and the serial-parallel converter (SPC) 405 for serial communication. The microprocessor 400B generates the command signal CNT and the drive command signal DR based on the monitor signal MON to be described later and the digital or analog input signal IN obtained from the input sensor group 103.

Similarly to FIG. 1, the watchdog timer (WDT) 406 monitors the signal pulse width of the watchdog signal WDS that is the pulse train generated by the microprocessor 400B. The watchdog timer (WDT) 406 generates the reset signal RST when the signal pulse width is the predetermined value or more to initialize the microprocessor 400B for restart, and generates the output enabling signal OUTE when the signal pulse width is less than the predetermined value so that the control output is generated from the microprocessor 400B.

A relationship between the start-up circuit 310B and the self-holding command signal DR0 generated by the microprocessor 400B or the output enabling signal OUTE generated by the watchdog timer 406 is described with reference to FIG. 10.

Similarly to FIG. 1, in the on-vehicle electrical load group 102, the plurality of light loads 111 and 112 are fed power from the power supply switch terminal Vbs via the common reverse current interrupting element 200s, the common protective circuit 201s, the individual light load switching elements 211 and 212, and the individual reverse current blocking diodes 215 and 216. The light loads 111 and 112 are generally connected in parallel to the individual commutation diodes 219 and 210.

Note that, the internal parasitic diode of the reverse current interrupting element 200s that is the P-channel field effect transistor can be energized in the same direction as the drive current of the light loads 111 and 112, while the internal parasitic diodes of the light load switching elements 211 and 212 are connected in the polarity that allows energization in the direction opposite to the drive current of the light loads 111 and 112.

Similarly to FIG. 1, in the on-vehicle electrical load group 102, the plurality of on-vehicle electrical loads 121 and 122 are fed power from the load power supply terminal Vba via the common reverse current interrupting element 200a, the common protective circuit 201a, and the individual load switching elements 221 and 222. The on-vehicle electrical loads 121 and 122 are generally connected in parallel to the individual commutation diodes 229 and 220.

Note that, the internal parasitic diode of the reverse current interrupting element 200a that is the P-channel field effect transistor can be energized in the same direction as the drive current of the on-vehicle electrical loads 121 and 122, while the internal parasitic diodes of the load switching elements 221 and 222 are connected in a polarity that allows energization in the direction opposite to the drive current of the on-vehicle electrical loads 121 and 222.

Note that, as compared to the case of FIG. 1, in the case of FIG. 9, a power feeding circuit for the on-vehicle electrical loads 121 and 122 and a power feeding circuit for the constant voltage power supply 300B are connected to the same load power supply terminal Vba, and the switching operation of the feeding switching element 120B is performed by the on-vehicle electronic control device 100B.

Next, a power feeding circuit for a control power supply circuit of the on-vehicle electronic control device of FIG. 9 is described in detail with reference to FIG. 10 being a detailed circuit diagram thereof mainly on points different from those in FIG. 2.

Figure 10:
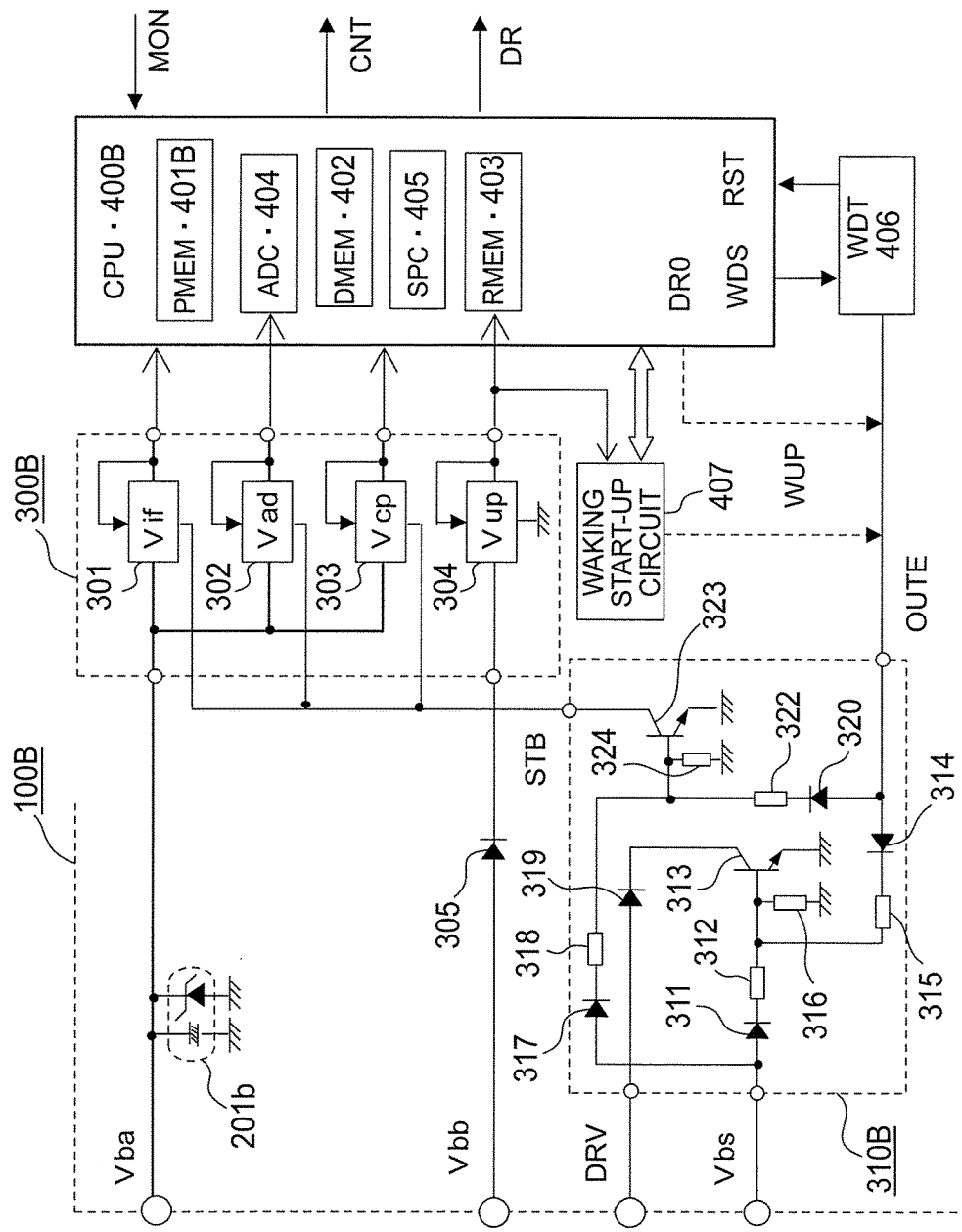
FIG. 10 is a detailed circuit diagram of a power feeding circuit for a control power supply circuit of the on-vehicle electronic control device of FIG. 9.

In FIG. 10, the constant voltage power supply 300B is fed power from the load power supply terminal Vba connected via the feeding switching element 120B (see FIG. 9) from the on-vehicle battery 101 so as to generate the stable control voltage Vcc. Similarly to the case of FIG. 2, the constant voltage power supply 300B includes the first control power supply 301 for generating the first control voltage Vif, the second control power supply 302 for generating the second control voltage Vad, and the third control power supply 303 for generating the third control voltage Vcp as the control voltage Vcc, and incorporates the backup power supply 304 for generating the backup voltage Vup.

The backup power supply 304 that is always fed power from the control supply terminal Vbb directly connected to the on-vehicle battery 101 through the reverse connection protecting diode 305 generates, for example, a low-accuracy and small-capacity voltage of DC 2.8 V to feed power to the RAM memory 403 when the control voltage Vcc is stopped, and also generates, for example, a low-accuracy and small-capacity voltage of DC 5 V to always feed power to the waking start-up circuit 407.

Similarly to FIG. 2, the waking start-up circuit 407 is, for example, a soak timer that measures an elapse time from the stop of the control operation of the microprocessor 400B, generates the waking command signal WUP when the elapse time reaches the predetermined time period, and sets to achieve writing from the microprocessor 400B before the microprocessor 400B is stopped for the predetermined elapse time period. Alternatively, the waking start-up circuit 407 is the communication circuit that generates the waking command signal WUP received from the host station via the communication line.

The start-up circuit 310B includes the start-up transistor 313 that is driven to be energized from the power supply switch terminal Vbs via the start-up diode 311 and the series resistor 312. The start-up transistor 313 is an NPN transistor whose energization is held by the holding diode 314 and the series resistor 315 when the watchdog timer 406 generates the output enabling signal OUTE. The open-circuit ballast resistor 316 is connected between the emitter terminal and the base terminal of the start-up transistor 313.

The start-up transistor 313 generates a feeding command signal DRV that is a feeding start signal for energizing the exciting coil 131 via a reverse excitation preventing diode 319.

The start-up circuit 310B further includes a start-up transistor 323 that is driven to be energized from the power supply switch terminal Vbs via the start-up diode 317 and the series resistor 318. The start-up transistor 323 is an NPN transistor whose energization is held by the holding diode 320 and a series resistor 322 when the watchdog timer 406 generates the output enabling signal OUTE. An open-circuit ballast resistor 324 is connected between an emitter terminal and a base terminal of the start-up transistor 323.

The start-up transistor 323 supplies the start-up signal STB to the first to third control power supplies 301 to 303 in the constant voltage power supply 300B.

When the microprocessor 400B receives the control voltage Vcc from the constant voltage power supply 300B, the microprocessor 400B performs power-on reset, and then starts a control operation so as to generate the watchdog signal WDS. Further, the microprocessor 400B recognizes that the power supply switch 110 is closed based on the command monitor signal MON20s so as to generate the self-holding command signal DR0.

Note that, in this embodiment, instead of the self-holding command signal DR0, the output enabling signal OUTE generated by the watchdog timer 406 is used.

Therefore, the start-up circuit 310B generates the feeding command signal DRV and the start-up signal STB when the power supply switch 110 is closed. When the microprocessor 400B is activated to generate the self-holding command signal DR0 or to cause the watchdog timer 406 to generate the output enabling signal OUTE, even if the power supply switch 110 is opened, the generation of the feeding command signal DRV and the start-up signal STB is thereafter maintained. When the microprocessor 400B finishes the after-run and stops by itself, the feeding command signal DRV and the start-up signal STB are also stopped.

Even if the power supply switch 110 is not closed, when the waking start-up circuit 407 generates the waking command signal WUP, the feeding command signal DRV and the start-up signal STB are generated to activate the microprocessor 400B. The microprocessor 400B performs an event-run based on the self-holding command signal DR0 or the output enabling signal OUTE and stops by itself.

A power feeding circuit from the power supply switch terminal Vbs of the on-vehicle electronic control device of FIG. 9 is as illustrated in FIG. 3.

A power feeding circuit from the load power supply terminal Vba to the on-vehicle electrical loads of the on-vehicle electronic control device of FIG. 9 is as illustrated in FIG. 4.

A switching gate circuit for the light load switching element of the on-vehicle electronic control device of FIG. 9 is as illustrated in FIG. 5.

A switching gate circuit for the load switching element of the on-vehicle electronic control device of FIG. 9 is as illustrated in FIG. 6.

(2) Detailed Description of Action and Operation

Next, the action and operation of the on-vehicle electronic control device according to the second embodiment of the present invention configured as illustrated in FIGS. 9 and 10 are described in detail mainly on points different from the case of FIGS. 1 and 2.

Note that, the flowchart for describing the operation illustrated in FIGS. 7 and 8 can be directly applied to the second embodiment by replacing the start-up signals STA1 and STA2 with the feeding command signal DRV and the start-up signal STB.

In FIGS. 9 and 10, when the power supply switch 110 is closed, the start-up circuit 310B generates the feeding command signal DRV and the start-up signal STB. As a result, the exciting coil 131 is energized so that the feeding switching element 120B that is the output contact of the electromagnetic relay is closed, and the constant voltage power supply 300B generates the control voltage Vcc to activate the microprocessor 400B.

Note that, the constant voltage power supply 300B may be configured to start the generation of the control voltage Vcc immediately after the feeding switching element 120B is closed. However, by configuring the constant voltage power supply 300B in such a form that generates the control voltage Vcc based on the start-up signal STB, there is an advantage that, when a short-circuit abnormality occurs in the feeding switching element 120B, the start-up signal STB can be stopped so as to stop generation of the output of the constant voltage power supply 300B.

Further, when the start-up circuit 310B is used to generate in a delayed manner or stop earlier the start-up signal STB as compared to the feeding command signal DRV (specifically, in response to the generation of the feeding command signal DRV, the feeding switching element 120B is closed and then the start-up signal STB is generated, and when the feeding command signal DRV is cancelled, the start-up signal STB is cancelled prior thereto), the output contact of the electromagnetic relay is closed, and then the operation of the constant voltage power supply 300B starts. By stopping the operation of the constant voltage power supply 300B and then de-energizing the electromagnetic relay, there is an advantage that the switching life of the output contact can be prolonged.

The microprocessor 400B recognizes the closed state of the power supply switch 110 based on the command monitor signal MON20s, and generates the self-holding command signal DR0 or the watchdog signal WDS. In this manner, while maintaining the generation state of the feeding command signal DRV and the start-up signal STB, the drive of the on-vehicle electrical load group 102 is controlled in response to the operation state of the input sensor group 103 and the content of an input/output control program in the program memory 401B.

When the power supply switch 110 is once closed, the microprocessor 400B further performs a predetermined after-run by an escaping operation program in the program memory 401B after the power supply switch 110 is opened, and then the microprocessor 400B stops the self-holding command signal DR0 or the watchdog signal WDS by itself.

Thus, the constant voltage power supply 300B stops the generation of the control voltage Vcc.

Even if the power supply switch 110 is not closed, when the waking start-up circuit 407 illustrated in FIG. 10 generates the waking command signal WUP, the start-up circuit 310B generates the feeding command signal DRV and the start-up signal STB. As a result, the constant voltage power supply 300B generates the control voltage Vcc to activate the microprocessor 400B.

The microprocessor 400B recognizes the opened state of the power supply switch 110 based on the command monitor signal MON20s, and recognizes that the waking command signal WUP is generated. Thus, the microprocessor 400B generates the self-holding command signal DR0 or the watchdog signal WDS. In this manner, while maintaining the generation state of the feeding command signal DRV and the start-up signal STB, the microprocessor 400B performs a predetermined event-run based on a monitoring operation program in the program memory 401B, and then stops the self-holding command signal DR0 or the watchdog signal WDS by itself. Thus, the constant voltage power supply 300B stops the generation of the control voltage Vcc.

When the on-vehicle battery 101 is connected in a reverse polarity as illustrated in the dotted lines of FIG. 9, the feeding switching element 120B that is the output contact of the electromagnetic relay is not closed, and hence a reverse voltage is not applied to the constant voltage power supply 300B or the power feeding circuit for the on-vehicle electrical loads 121 and 122.

Therefore, a reverse voltage is not applied to the protective circuit 201b, the constant voltage power supply 300B, or the microprocessor 400B, and a reverse voltage is not applied to the protective circuit 201a or the power feeding circuit for the on-vehicle electrical loads 121 and 122.

Further, even when the power supply switch 110 is closed, a reverse voltage is not applied to the protective circuit 201s due to the reverse current interrupting element 200s.

As described above, when the feeding switching element 120B has a reverse connection protecting function, although the reverse current interrupting element 200a does not need the reverse connection protecting function, the reverse current interrupting element 200a plays an important role for short-to-power protection.

Next, a protective operation of a case where the on-vehicle battery 101 is connected in a normal polarity and any one of the on-vehicle electrical loads 121 and 122 has a short-to-power abnormality in the load wiring is described in order.

Note that, in the case of the light loads 111 and 112, the reverse current blocking diodes 215 and 216 are connected in series thereto. Therefore, abnormalities are prevented, such as flowing of a short-to-power current through a sneak path into another light load or into the power supply switch terminal Vbs, which causes generation of the command monitor signal MON20s even when the power supply switch 110 is not closed.

The problematic short-to-power abnormality of the on-vehicle electrical loads 121 and 122 is described of a case where operation/stop is performed by the power supply switch 110.

(A) When Power Supply Switch 110 is Opened and Feeding Switching Element 120B is Opened The power supply switch 110 is opened, and hence the reverse current stop gate circuit 206a does not operate. The reverse current interrupting element 200a is opened, and hence a short-to-power current never flows through a sneak path into the load power supply terminal Vba.

Therefore, power is not fed to the constant voltage power supply 300B due to the short-to-power power.

Further, the microprocessor 400B is stopped and the load drive command signals DR21 and DR22 are not generated, and hence power is not fed through a sneak path from one on-vehicle electrical load in which the short-to-power abnormality has occurred into the other on-vehicle electrical load in which a short-to-power abnormality has not occurred.

(B) When Power Supply Switch 110 is Closed and Feeding Switching Element 120B is Still Opened Even when the power supply switch 110 is closed, the power receiving monitor signal MON20a is not generated yet, and hence the reverse current stop gate circuit 206a does not operate. The reverse current interrupting element 200a is opened, and hence a short-to-power current does not flow through a sneak path into the load power supply terminal Vba.

Therefore, power is not fed to the constant voltage power supply 300B due to the short-to-power power.

Further, power is not fed yet to the microprocessor 400B either, and hence the microprocessor 400B does not generate the load drive command signals DR21 and DR22. Therefore, power is not fed through a sneak path from one on-vehicle electrical load in which a short-to-power abnormality has occurred into the other on-vehicle electrical load in which a short-to-power abnormality has not occurred.

(C) When Power Supply Switch 110 is Closed and Feeding Switching Element 120B is Opened A power supply voltage is applied to the load power supply terminal Vba, and hence even when the reverse current interrupting element 200a is closed, a short-to-power current does not flow through a sneak path into the load power supply terminal Vba.

Further, if the operation of the microprocessor 400B starts, a short-to-power abnormality is detected, and hence by stopping the generation of the load drive command signals DR21 and DR22, power is not fed through a sneak path from one on-vehicle electrical load in which a short-to-power abnormality has occurred into the other on-vehicle electrical load in which a short-to-power abnormality has not occurred. Even when the generation of the load drive command signals DR21 and DR22 is not stopped, a short-to-power current that is caused by the difference of the voltage drop between the power supply line on the normal side and the power supply line on the short-to-power side has a small value, and hence an actual damage that spreads to others is small.

(D) Abnormal State in which Power Supply Switch 110 is Closed and Feeding Switching Element 120B is Opened from Closed State This case leads to a state in which the short-to-power power flows through a sneak path into the load power supply terminal Vba via the reverse current interrupting element 200a, and hence power is fed to the constant voltage power supply 300B. However, the microprocessor 400B detects the short-to-power abnormality so as to open the reverse current interrupting element 200a, and hence the short-to-power current is prevented from flowing through a sneak path into the load power supply terminal Vba. As a result, the constant voltage power supply 300B does not operate, and the microprocessor 400B stops.

Therefore, the load drive command signals DR21 and DR22 are stopped, and hence power is not fed through a sneak path from one on-vehicle electrical load in which a short-to-power abnormality has occurred into the other on-vehicle electrical load in which a short-to-power abnormality has not occurred.

As described above, assuming a double abnormality in which such an abnormal state that the feeding switching element 120B is opened from the closed state even when the power supply switch 110 is closed occurs and further the short-to-power abnormality occurs in the load wiring, the short-to-power abnormality detection is meaningful, but the original advantage of detecting the short-to-power abnormality is to store the abnormality occurrence history and facilitate the maintenance and inspection.

(E) When Power Supply Switch 110 is Opened and Feeding Switching Element 120B is Still Closed A power supply voltage is applied to the load power supply terminal Vba, and hence even when the reverse current interrupting element 200a is closed, a short-to-power current does not flow through a sneak path into the load power supply terminal Vba. However, if the power supply switch 110 is opened when the microprocessor 400B is operating, the reverse current interrupting element 200a is opened.

Further, when the microprocessor 400B detects the short-to-power abnormality so as to stop the load drive command signals DR21 and DR22, power is not fed through a sneak path from one on-vehicle electrical load in which a short-to-power abnormality has occurred into the other on-vehicle electrical load in which a short-to-power abnormality has not occurred. Even when the generation of the load drive command signals DR21 and DR22 is not stopped, a short-to-power current that is caused by the difference of the voltage drop between the power supply line on the normal side and the power supply line on the short-to-power side has a small value, and hence an actual damage that spreads to others is small.

Further, when the microprocessor 400B stops, the load drive command signals DR21 and DR22 also stop, and hence power is not fed through a sneak path similarly.

(3) Description of Modified Examples

Next, a configuration of a load feeding circuit of the on-vehicle electronic control device according to a first partially modified embodiment of the present invention is described in detail with reference to FIG. 11 being a detailed circuit diagram thereof.

Figure 11:
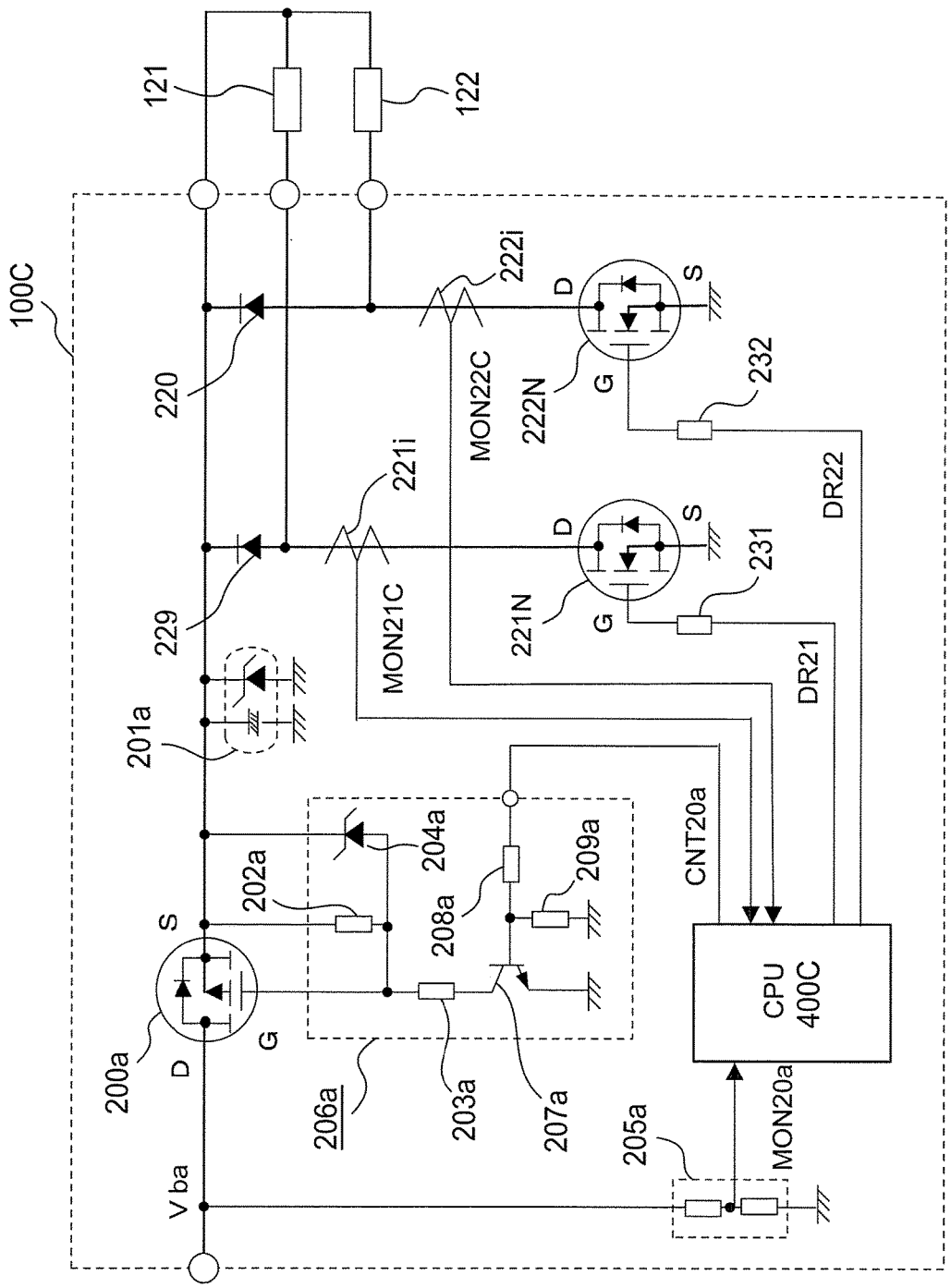
FIG. 11 is a detailed circuit diagram of a load feeding circuit according to a first partially modified example of the present invention.

An on-vehicle electronic control device 100C illustrated in FIG. 11 may be an alternative to the above-mentioned on-vehicle electronic control device 100A or on-vehicle electronic control device 100B. The on-vehicle electronic control device 100C differs from the on-vehicle electronic control devices 100A and 100B in that, as load switching elements 221N and 222N for driving the on-vehicle electrical loads 121 and 122, N-channel field effect transistor are used, which are connected at downstream positions of the on-vehicle electrical loads 121 and 122.

Therefore, the reverse current interrupting element 200a, the reverse current stop gate circuit 206a therefor, the power receiving monitor signal MON20a generated by the voltage dividing resistor 205a, and the protective circuit 201a are similar to those in FIG. 4.

In FIG. 11, the load switching elements 221N and 222N connected at downstream positions of the on-vehicle electrical loads 121 and 122 have drain terminals D connected to the on-vehicle electrical loads 121 and 122, respectively, source terminals S connected to the ground circuit GND, and gate terminals G supplied with the load drive command signals DR21 and DR22 generated by a microprocessor 400C via drive resistors 231 and 232.

Further, overcurrent detection signals MON21C and MON22C from current detection elements 221i and 222i provided to the respective load switching elements 221N and 222N are input to the microprocessor 400C. When load short-circuit or short-to-power in negative load wiring occurs, the load drive command signals DR21 and DR22 are cancelled.

In each of the load switching elements 221N and 222N that are N-channel field effect transistors, energization between the drain terminal D and the source terminal S is achieved when the potential of the gate terminal G is higher than the potential of the source terminal S.

The energization direction between the drain terminal D and the source terminal S is from any one terminal having a higher potential to the other terminal having a lower potential, but an internal parasitic diode is generated in a parallel state between the drain terminal D and the source terminal S. Therefore, a current flowing from the source terminal S to the drain terminal D cannot be interrupted even when the gate circuit is interrupted.

Therefore, when the microprocessor 400C generates the load drive command signals DR21 and DR22, the load switching elements 221N and 222N are closed, and power is fed from the load power supply terminal Vba via the reverse current interrupting element 200a into the on-vehicle electrical loads 121 and 122. When the microprocessor 400C stops the load drive command signals DR21 and DR22, the load switching elements 221N and 222N are opened, and the current that has been flowing through the on-vehicle electrical loads 121 and 122 is commutated to the commutation diodes 229 and 220 so as to be attenuated.

The short-to-power abnormality or short-to-ground abnormality of the load wiring in such a downstream control system are treated as follows.

First, a case where a short-to-power abnormality has occurred on the upstream side of the load wiring is described. In a case where the monitor voltage of the power receiving monitor signal MON20a is not generated when the reverse current interrupting element 200a is opened for a moment periodically, and the monitor voltage of the power receiving monitor signal MON20a is generated when the reverse current interrupting element 200a is closed, it is determined that the short-to-power abnormality has occurred. When the feeding switching elements 120A and 120B (see FIGS. 1 and 9) are opened, all of the load switching elements and the reverse current interrupting element are opened.

Further, assuming a case where a short-to-ground abnormality has occurred on the upstream side of the load wiring, the following configuration is necessary. A serial switching element (not shown) is added, which is connected to the reverse current interrupting element 200a so that directions of the internal parasitic diodes thereof are opposite to each other. With the overcurrent interrupting function by the serial switching element, the short-to-ground current is interrupted. This state is input in an interrupted manner to the microprocessor 400C so as to stop the energization command for the serial switching element by the microprocessor 400C.

Next, a case where a short-to-ground abnormality has occurred on the downstream side of the load wiring is described. The state in which a current detection signal is not generated from the load switching elements 221N and 222N even if the load switching elements 221N and 222N are driven to be closed is input to the microprocessor 400C. In response thereto, the microprocessor 400C performs processing such as opening the serial switching element (not shown) described above.

Further, a case where a short-to-power abnormality has occurred on the downstream side of the load wiring is described. An excessive current flows when the load switching elements 221N and 222N are driven to be closed. The short-to-power current is interrupted by an overcurrent interrupting function of the load switching elements 221N and 222N. This state is input to the microprocessor 400C so as to stop the load drive command signals DR21 and DR22 for the corresponding load switching elements 221N and 222N by the microprocessor 400C.

On the other hand, the short-to-power current attempts to flow into the load power supply terminal Vba via the commutation diodes 229 and 220, the internal parasitic diode of the serial switching element (not shown), and the reverse current interrupting element 200a. However, at least when the feeding switching elements 120A and 120B are opened, the microprocessor 400C does not operate, or when power is fed to the microprocessor 400C, the drive for closure of the reverse current interrupting element 200a is stopped along with the detection of the short-to-power abnormality. In this manner, a short-to-power current is prevented from flowing through a sneak path into the load power supply terminal Vba.

Therefore, in the case of FIG. 11, various abnormality detections are required as compared to the cases of FIGS. 1 and 9, and how to detect the short-to-power abnormality differs. All of the cases remain to have a configuration capable of preventing the short-to-power current from flowing through a sneak path into the load power supply terminal Vba by the reverse current interrupting element 200a.

Next, a configuration of a load feeding circuit of the on-vehicle electronic control device according to a second partially modified embodiment of the present invention is described in detail with reference to FIG. 12 being a detailed circuit diagram thereof.

Figure 12:
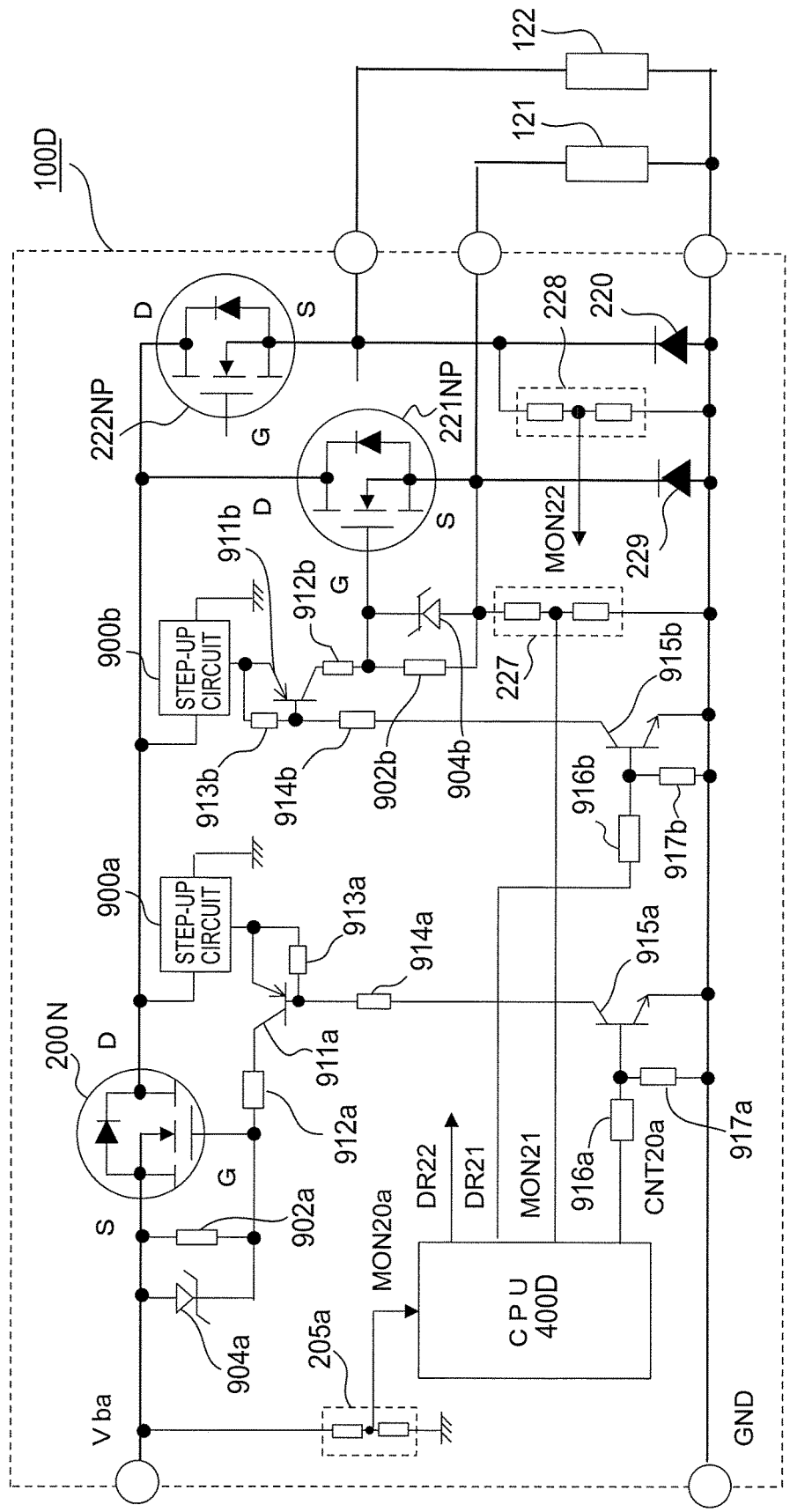
FIG. 12 is a detailed circuit diagram of a load feeding circuit according to a second partially modified example of the present invention.
Figure 13:
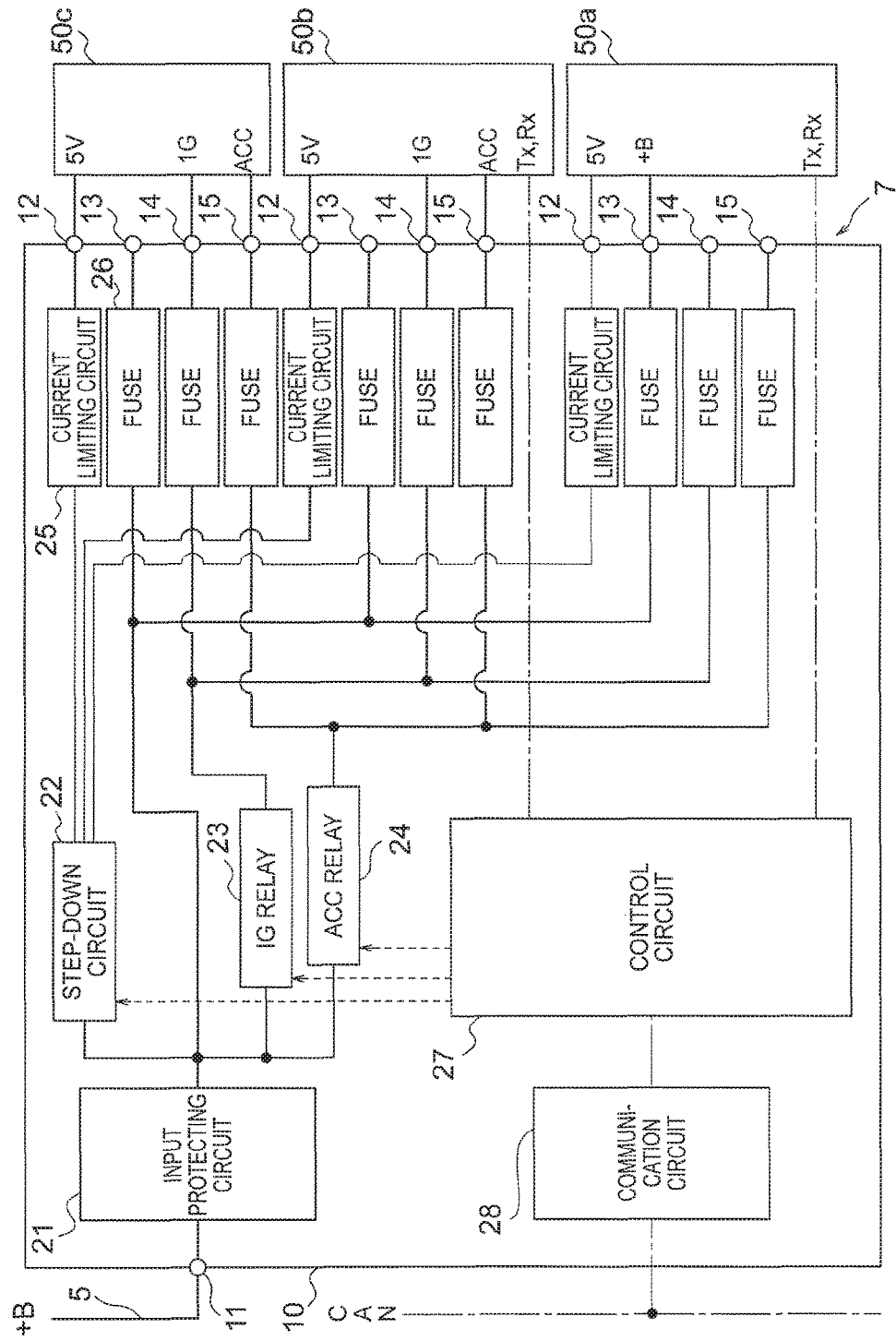
FIG. 13 is a diagram illustrating a related-art on-vehicle power supply control device.
Figure 14:
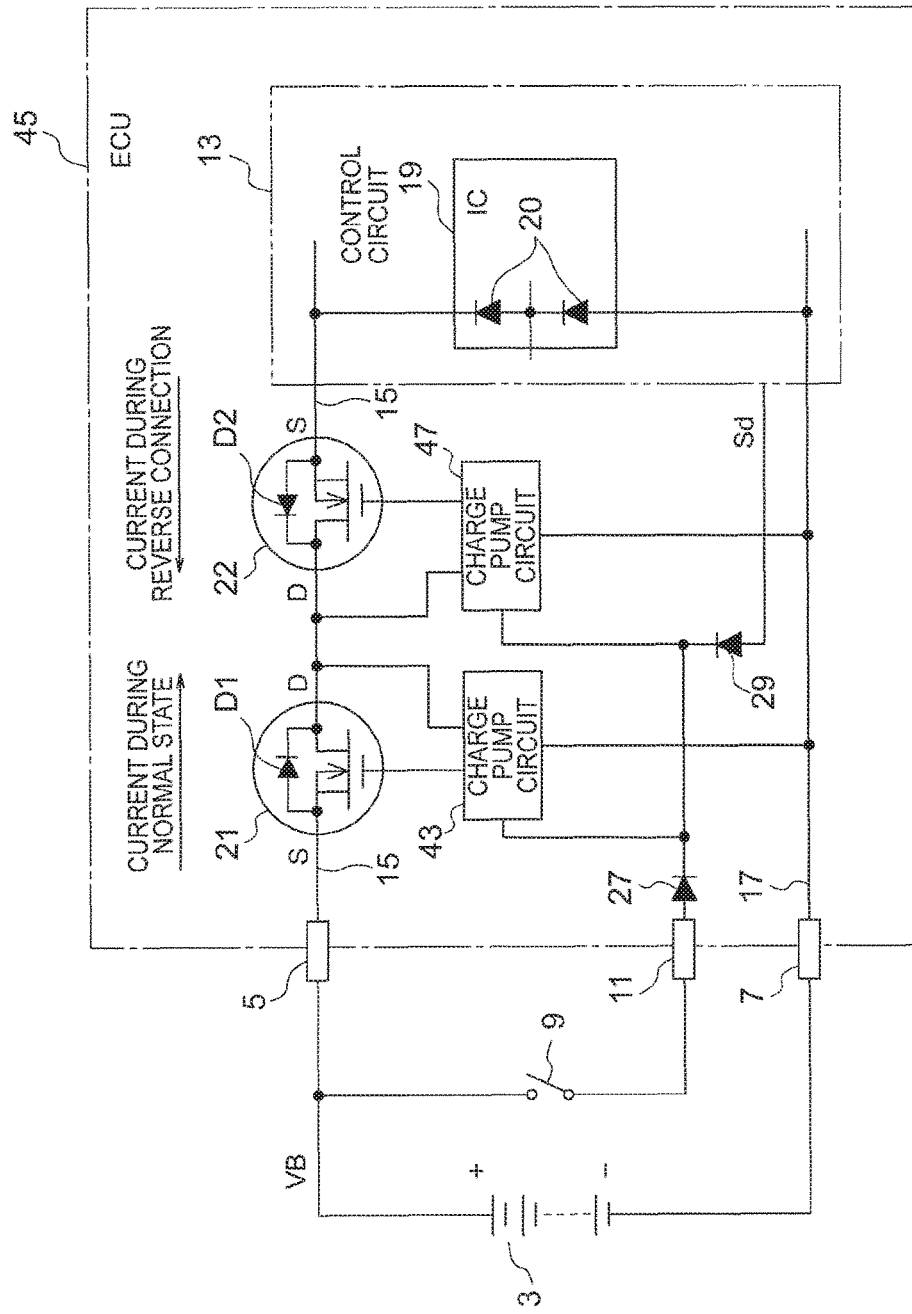
FIG. 14 is a diagram illustrating a related-art power supply reverse connection protecting circuit.

Note that, an on-vehicle electronic control device 100D illustrated in FIG. 12 may be an alternative to the above-mentioned on-vehicle electronic control device 100A or on-vehicle electronic control device 100B. The on-vehicle electronic control device 100D differs from the on-vehicle electronic control devices 100A and 100B in that, as a reverse current interrupting element 200N and load switching elements 221NP and 222NP for driving the on-vehicle electrical loads 121 and 122, N-channel field effect transistor are used.

In FIG. 12, the reverse current interrupting element 200N has a source terminal S connected to the load power supply terminal Vba side, and a drain terminal D connected to drain terminals D of the load switching elements 221NP and 222NP. The load switching elements 221NP and 222NP have source terminals S connected to the on-vehicle electrical loads 121 and 122, respectively. The commutation diodes 229 and 220 are connected in parallel to the on-vehicle electrical loads 121 and 122, and negative terminals thereof are connected to the ground circuit GND.

An output voltage of a step-up circuit 900a that is fed power from the load power supply terminal Vba via the internal parasitic diode of the reverse current interrupting element 200N is applied to a gate terminal G of the reverse current interrupting element 200N via a series circuit including an energization command transistor 911a and a voltage dividing resistor 912a. Further, a voltage dividing resistor 902a and a constant voltage diode 904a are connected in parallel to each other between the gate terminal G and the source terminal S of the reverse current interrupting element 200N.

Therefore, when the energization command transistor 911a is closed, the output voltage of the step-up circuit 900a is divided by the voltage dividing resistors 912a and 902a to be applied between the gate terminal G and the source terminal S of the reverse current interrupting element 200N. This application voltage is limited by the constant voltage diode 904a, and when the gate potential is higher than the source potential, the reverse current interrupting element 200N is closed.

An open-circuit ballast resistor 913a is connected between an emitter terminal and a base terminal of the energization command transistor 911a being a PNP junction type transistor. The base terminal of the energization command transistor 911a is connected to a collector terminal of an auxiliary transistor 915a being an NPN junction type transistor via a collector resistor 914a. An emitter terminal of the auxiliary transistor 915a is connected to the ground circuit GND.

A base terminal of the auxiliary transistor 915a is driven to be energized based on the load power receiving command signal CNT20a generated by the microprocessor 400D via a base resistor 916a, and an open-circuit ballast resistor 917a is connected between the base terminal and the emitter terminal of the auxiliary transistor 915a.

Therefore, when the microprocessor 400D generates the load power receiving command signal CNT20a, the auxiliary transistor 915a is energized, and thus the energization command transistor 911a is energized so that the reverse current interrupting element 200N is driven to be closed.

Correspondingly to reference symbols 900a to 904a and 911a to 917a relating to the reverse current interrupting element 200N, circuit elements denoted by reference symbols 900b to 904b and 911b to 917b are arranged for the load switching element 221NP. When the microprocessor 400D generates the load drive command signal DR21, the auxiliary transistor 915b is energized, and thus the energization command transistor 911b is energized so that the load switching element 221NP is driven to be closed.

Also for the load switching element 222NP, circuit elements similar to those for the load switching element 221NP are arranged. When the microprocessor 400D generates the load drive command signal DR22, the auxiliary transistor (not shown) is energized, and thus the energization command transistor (not shown) is energized so that the load switching element 222NP is driven to be closed.

Therefore, in the case of FIG. 12, as compared with the cases of FIGS. 1 and 9, the reverse current interrupting element and the load switching element are only changed from P-channel field effect transistors to N-channel field effect transistors. Therefore, the microprocessor only needs to perform a completely same control operation.

Now, a processing method when a short-to-power abnormality occurs in the various embodiments is summarized. The first processing content that is required to be considered is to prevent the short-to-power current from flowing through a sneak path into the load power supply terminal Vba and from flowing outside. The second processing content is to prevent occurrence of internal feeding of power through a sneak path from an on-vehicle electrical load in which short-to-power has occurred into an on-vehicle electrical load in which short-to-power has not occurred.

First, in the case of FIG. 1, when the feeding switching element 120A is closed, even if a short-to-power abnormality occurs in any of the on-vehicle electrical loads, a short-to-power current does not flow through a sneak path so as to flow out from the load power supply terminal Vba. There may be a risk that power is fed inside through a sneak path, but even if power is fed through a sneak path, actual damage that spreads to others is small. It is desired that the load switching element for the load in which a short-to-power abnormality has occurred be forcibly closed so as to prevent a current from flowing through the internal parasitic diode of the load switching element.

In the case of FIG. 1, even when the feeding switching element 120A is opened, if the power supply switch 110 is opened, the reverse current interrupting element 200a is opened so as to interrupt the short-to-power current. When the start-up signal STA1 is stopped so as to stop feeding power to the microprocessor 400A, the reverse current interrupting element 200a and the load switching elements 221 and 222 are opened so as to stop feeding power inside through a sneak path as well as feeding power outside through a sneak path.

However, in the case of FIG. 1, under such an abnormal state in which the feeding switching element 120A has changed from the closed state to the opened state even if the power supply switch 110 is closed, the microprocessor 400A detects the occurrence of the short-to-power abnormality. With this, the reverse current interrupting element 200a and all of the load switching elements 221 and 222 are opened so as to stop feeding power inside through a sneak path as well as feeding power outside through a sneak path.

On the other hand, in the case of FIG. 9, when the feeding switching element 120B is closed, even if a short-to-power abnormality occurs in any of the on-vehicle electrical loads, a short-to-power current does not flow through a sneak path so as to flow out from the load power supply terminal Vba. There may be a risk that power is fed inside through a sneak path, but even if power is fed through a sneak path, actual damage that spreads to others is small. It is desired that the load switching element for the load in which a short-to-power abnormality has occurred be forcibly closed so as to prevent a current from flowing through the internal parasitic diode of the load switching element. Processing similar to that in the case of FIG. 1 may be performed.

In the case of FIG. 9, when the feeding switching element 120B has changed from the closed state to the opened state, power is fed through a sneak path from the short-to-power power supply via the energized reverse current interrupting element 200a into the constant voltage power supply 300B.

In this case, when the power supply switch 110 is opened, the reverse current interrupting element 200a and all of the load switching elements 221 and 222 are opened so as to stop feeding power inside through a sneak path as well as feeding power outside through a sneak path.

However, even in the case of FIG. 9, under such an abnormal state in which the opened state of the feeding switching element 120B is maintained even if the power supply switch 110 is closed, similarly to the case of FIG. 1, the microprocessor 400B detects the occurrence of the short-to-power abnormality. With this, the reverse current interrupting element 200a and all of the load switching elements 221 and 222 are opened so as to stop feeding power inside through a sneak path as well as feeding power outside through a sneak path.

(4) Main Point and Feature of Second Embodiment

As is apparent from the above description, the on-vehicle electronic control device 100B according to the second embodiment of the present invention includes: the microprocessor 400B for controlling the drive of the plurality of on-vehicle electrical loads 121 and 122 via the plurality of load switching elements 221 and 222 in response to the operation state of the input sensor group 103 and the content of the cooperating program memory 401B; and the constant voltage power supply 300B that is fed power from the on-vehicle battery 101 so as to supply the predetermined stable control voltage Vcc to the microprocessor. The microprocessor 400B is configured to start the control operation when the power supply switch 110 is closed, perform the predetermined after-run based on one of the self-holding command signal DR0 and the output enabling signal OUTE even when the power supply switch is opened after the power supply switch 110 is once closed, and then stop by itself.

The constant voltage power supply 300B is configured to be fed power from the load power supply terminal Vba that is connected to the on-vehicle battery 101 via the feeding switching element 120B to generate the predetermined stable control voltage Vcc, the feeding switching element 120B being driven to be closed by the start-up circuit 310B.

The start-up circuit 310B is configured to generate the feeding command signal DRV when the power supply switch 110 is closed, and maintain, when the power supply switch 110 is once closed, generation of the feeding command signal DRV until the predetermined after-run is finished even when the power supply switch is opened.

Each of the plurality of on-vehicle electrical loads 121 and 122 is fed power to be driven from the load power supply terminal Vba via the series circuit including the reverse current interrupting element 200a for the load circuit and corresponding one of the plurality of load switching elements 221 and 222.

As at least a part of the plurality of load switching elements 221 and 222, a field effect transistor is used, which is connected in such a polarity that, when being driven to be energized by the microprocessor 400B, a drive current for any one of the plurality of on-vehicle electrical loads 121 and 122 flows in an opposite direction to an energization direction of an internal parasitic diode of the field effect transistor.

As the reverse current interrupting element 200a for the load circuit, the field effect transistor is used, which is connected in such a relationship that, in a case where the on-vehicle battery 101 is connected in a normal polarity when the load current flows, the load current for the plurality of on-vehicle electrical loads 121 and 122 flows in the same direction as the energization direction of the internal parasitic diode of the field effect transistor, and in a case where the on-vehicle battery 101 is connected in an abnormal reverse polarity, the gate voltage becomes the reverse polarity to stop the load current. The reverse current interrupting element 200a for the load circuit is configured to interrupt the energization when the on-vehicle battery 101 is connected in the abnormal reverse polarity.

Further, the reverse current interrupting element 200a for the load circuit is driven to be closed when one of a state in which the power supply switch 110 is closed and a state in which the feeding command signal DRV is generated is achieved, and when a state in which the normal polarity power supply voltage is applied to the load power supply terminal Vba is achieved. The reverse current interrupting element 200a for the load circuit is opened one of when the power supply switch 110 is opened and when the generation of the feeding command signal DRV is stopped in a case where the short-to-power abnormality in which the load wiring is abnormally brought into contact with positive wiring of the on-vehicle battery 101 occurs, to thereby prevent the short-to-power current from flowing through a sneak path into the load power supply terminal Vba at least when the feeding switching element 120B is in an opened state.

The load power supply terminal Vba, which is connected to the on-vehicle battery 101 via the feeding switching element 120B, is connected to the protective circuit 201b including at least one of the polar capacitor or the constant voltage diode for surge absorption.

The feeding switching element 120B is one of:
the output contact of the electromagnetic relay in which the reverse excitation preventing diode 319 is connected to the exciting coil 131, the output contact being prevented from performing a closure operation when a connection polarity of the on-vehicle battery 101 is improper so as to achieve the reverse connection protecting function; and
the non-contact switching element in which the pair of field effect transistors is connected in series so that the energization directions of the internal parasitic diodes thereof are opposite to each other, to thereby achieve the reverse connection protecting function and the switching element function.

When the feeding switching element 120B is the non-contact switching element, the feeding switching element 120B is connected one of between the on-vehicle battery 101 and the load power supply terminal Vba and between the load power supply terminal Vba and the protective circuit 201b.

The description above relates to claim 5 of the present invention. The load power supply terminal, which is connected to the on-vehicle battery via the feeding switching element, is connected to the protective circuit that is the polar capacitor or the constant voltage diode for surge absorption. Further, the feeding switching element has the reverse connection protecting function.

Therefore, the following features are provided. When the on-vehicle battery is connected in an improper polarity, not only the constant voltage power supply but also the protective circuit is prevented from being damaged.

When the feeding switching element 120B is the output contact of the electromagnetic relay, the constant voltage power supply 300B starts to generate the predetermined stable control voltage Vcc based on the start-up signal STB generated by the start-up circuit 310B in response to the operation of the power supply switch 110.

The start-up signal STB is the same signal as the feeding command signal DRV, or, in response to generation of the feeding command signal DRV, the feeding switching element 120B is closed and then the start-up signal STB is generated, and when the feeding command signal DRV is cancelled, the start-up signal STB is cancelled prior thereto.

The constant voltage power supply 300B is one of activated and stopped in association with one of a closing command and an opening command of the feeding switching element 120B, or the constant voltage power supply 300B is one of activated in a delayed manner and stopped earlier as compared to one of the closing command and the opening command of the feeding switching element 120B.

The description above relates to claim 6 of the present invention. The feeding switching element and the constant voltage power supply respectively perform a closure operation and an operation of generating a control voltage by the feeding start command signal and the start-up command signal generated by the start-up circuit.

Therefore, the following effects can be obtained. Even if the output contact of the electromagnetic relay, which is the feeding switching element, is welded, when the power supply switch is opened, the constant voltage power supply stops generation of the control voltage. Thus, the microprocessor stops the control operation, and thus the load switching element is opened. Therefore, unnecessary current consumption is prevented.

Further, the following features are provided. The constant voltage power supply is activated in a delayed manner or stopped earlier as compared to the closing and opening operation of the output contact of the electromagnetic relay, which is the feeding switching element. In this manner, an interrupted current to the output contact is suppressed, and the life of the electromagnetic relay can be prolonged.

The start-up circuit 310B is further configured to generate the feeding command signal DRV when the waking start-up circuit 407 that is fed power from the control power supply terminal Vbb directly connected to the on-vehicle battery 101 generates a waking start-up signal WUP even if the power supply switch 110 is not closed.

The waking start-up circuit 407 is one of:
a timer circuit for generating an end-of-time signal that is the waking command signal WUP when an opened period of the power supply switch 110 has elapsed for the predetermined period; and
the communication circuit for generating the waking command signal WUP received from the host station via the communication line.

The microprocessor 400B is further configured to one of generate the self-holding command signal DR0 and generate the watchdog signal WDS to be output to the watchdog timer 406 when the constant voltage power supply 300B generates the predetermined stable control voltage Vcc based on the waking command signal WUP so as to activate the microprocessor 400B, the watchdog timer 406 generating the output enabling signal OUTE when the signal pulse width of the watchdog signal WDS is less than the predetermined value.

The microprocessor 400B is further configured to one of write a time period from the predetermined event-run to a next waking activation to the waking start-up circuit 407 and transmit the time period to the host station via the communication line, and then stop generation of one of the self-holding command signal DR0 and the watchdog signal WDS.

The description above relates to claim 7 of the present invention. Even when the power supply switch is not manually closed, the microprocessor is waked and activated by the waking start-up circuit. Thus, a power feeding circuit configuration capable of automatically transforming to a power fed state is obtained.

Therefore, similarly to the case of the first embodiment, the following features are provided. In a parked vehicle, the state of an input sensor may be periodically monitored to be stored, and an event-run such as determining and storing the presence/absence of abnormality may be automatically performed.

The microprocessor 400B is further configured to one of:
drive to close the reverse current interrupting element 200a for a load circuit via the reverse current stop gate circuit 206a by reading a monitor voltage of the command monitor signal MON20s for monitoring the closed state of the power supply switch 110 and the monitor voltage of the power receiving monitor signal MON20a for monitoring the closed state of the feeding switching element 120B when both of the monitor voltages have the predetermined value or more, and interrupt, after the reverse current interrupting element 200*a* for a load circuit is once driven to be closed, the gate circuit in the reverse current stop gate circuit 206*a* with respect to the reverse current interrupting element 200*a* for a load circuit when the power supply switch 110 is opened; and drive to close the reverse current interrupting element 200*a* for a load circuit when the feeding command signal DRV is generated and the monitor voltage of the power receiving monitor signal MON20*a* is equal to or more than the predetermined voltage even if the power supply switch 110 is not closed, and open, after the reverse current interrupting element 200*a* for a load circuit is once driven to be closed, the reverse current interrupting element 200*a* for a load circuit when the feeding command signal DRV is stopped.

The description above relates to claim 8 of the present invention. The energization of the reverse current interrupting element for a load circuit is controlled by the microprocessor. When the power supply switch is in the closed state or when the microprocessor is in an event-run state by the waking start-up circuit, if a power supply voltage is applied to the load power supply terminal, the reverse current interrupting element for a load circuit is driven to be closed.

Therefore, similarly to the case of the first embodiment, the following features are provided. The energization of the reverse current interrupting element for a load circuit is controlled by the normal operation of the microprocessor. When the microprocessor is stopped, the energization of the reverse current interrupting element is stopped. Therefore, a short-to-power current does not flow through a sneak path into a load drive terminal. When the microprocessor is stopped, the load drive command signal is also stopped. Therefore, feeding of power through a sneak path into the on-vehicle electrical load in which a short-to-power abnormality has not occurred is also stopped.

The microprocessor 400B and the cooperating program memory 401B incorporate a control program that is short-to-power abnormality detection section.

The short-to-power abnormality detection section is configured to compare logic states of load drive command signals DR21 and DR22 for the plurality of load switching elements 221 and 222 with signal voltage levels of the load voltage monitor signals MON21 and MON22 that are proportional to output voltages of the plurality of load switching elements 221 and 222, and determine that there is a risk of occurrence of the short-to-power abnormality when the load voltage monitor signals MON21 and MON22 are generated even if the plurality of load switching elements 221 and 222 are opened.

The microprocessor 400B is further configured to open all of the plurality of load switching elements 221 and 222 and the reverse current interrupting element 200*a* for a load circuit when at least the feeding switching element 120B is opened in a case where the short-to-power abnormality detection section determines that there is the risk of the short-to-power abnormality.

The description above relates to claim 9 of the present invention. The microprocessor is configured to open all of the load switching elements and the reverse current interrupting element for a load circuit when at least the feeding switching element is opened in a case where the short-to-power abnormality detection section determines that there is the risk of the short-to-power abnormality.

Therefore, similarly to the case of the first embodiment, the following features are provided. In a case where the feeding switching element is forcibly opened even when the power supply switch is not opened along with the occurrence of the short-to-power abnormality, the short-to-power power is prevented from flowing through a sneak path into the load power supply terminal so as to be fed to the constant voltage power supply, and the combined on-vehicle electronic control device is prevented from malfunctioning.

In the on-vehicle electrical load group 102, the light loads 111 and 112 represented by an exciting coil of a load power supply relay having a small energization current are controlled to be driven from the power supply switch 110 via the series circuit including the light load switching elements 211 and 222 and the reverse current blocking diodes 215 and 216.

The description above relates to claim 10 of the present invention. Among the plurality of on-vehicle electrical loads, the light load can be driven from the power supply switch via the load switching element and the reverse current blocking diode.

Therefore, the following features are provided. Load circuits of a specific group can configure a single power supply circuit by using a load relay driven from the power supply switch without depending on the feeding switching element. Further, even when a short-circuit abnormality occurs in the light load, there is no risk of reverse flow to the power supply switch side due to the blocking by the reverse current blocking diode, and it is possible to prevent false recognition that the power supply switch is closed due to the short-to-power power even if the power supply switch is opened.

The power supply switch terminal Vbs, which is connected to the on-vehicle battery 101 via the power supply switch 110, is connected to the protective circuit 201*s* including at least one of the polar capacitor or the constant voltage diode for surge absorption.

The power supply switch terminal Vbs and the protective circuit 201*s* have the reverse current interrupting element 200*s* for a protective circuit connected therebetween.

The microprocessor 400B is further configured to:
determine that the power supply switch 110 is closed by reading the monitor voltage of the command monitor signal MON20*s* for monitoring the closed state of the power supply switch 110 when the monitor voltage is increased up to the first predetermined voltage, and drive to close the reverse current interrupting element 200*s* for a protective circuit via the reverse current stop gate circuit 206*s*; and determine that the power supply switch 110 is opened when the monitor voltage is reduced to be less than the second predetermined voltage that is the value equal to or less than the first predetermined voltage, and open the reverse current interrupting element 200*s* for a protective circuit.

The start-up circuit 310B is configured in a state that enables generation of the feeding command signal DRV when the power supply switch 110 is closed and a voltage equal to or more than the third predetermined voltage that is a voltage further lower than the second predetermined voltage is applied to the start-up circuit 310B.

The description above relates to claim 11 of the present invention. The power supply switch terminal, which is connected to the on-vehicle battery via the power supply switch, is connected to the protective circuit that is the polar capacitor or the constant voltage diode for surge absorption via the reverse current interrupting element. Further, the microprocessor is configured to monitor the voltage of the power supply switch terminal, determine the opened/closed state of the power supply switch, and control the energization of the reverse current interrupting element for a protective circuit.

Therefore, similarly to the case of the first embodiment, the following features are provided. When the on-vehicle battery is connected in an improper polarity, the protective circuit can be prevented from being damaged, and when the on-vehicle battery is connected in a normal polarity, the polar capacitor can be freely charged/discharged.

Further, when the output voltage of the on-vehicle battery is abnormally reduced, the microprocessor can determine the opened/closed state of the power supply switch during a period in which the constant voltage power supply generates the predetermined control voltage. Further, the reverse current interrupting element is opened after the polar capacitor in the protective circuit is discharged so as to have a voltage equal to or less than the second predetermined voltage. Further, a hysteresis characteristic may be provided to a determination level. Thus, false determination due to the noise voltage can be prevented.

Note that, the present invention is not limited to the above-mentioned respective embodiments, and encompasses all possible combinations of the embodiments including the modified examples of FIGS. 11 and 12.

Note that, the present invention is not limited to the above-mentioned respective embodiments, and encompasses all possible combinations of the embodiments including the modified examples of FIGS. 11 and 12.

Reflecting the modified examples to the first embodiment (claim 1), the on-vehicle electronic control devices 100A, 100C, and 100D each include: microprocessors 400A, 400C, and 400D for controlling the drive of the plurality of on-vehicle electrical loads 121 and 122 via the plurality of load switching elements 221 and 222, 221N and 222N, and 221NP and 222NP in response to the operation state of the input sensor group 103 and the content of the cooperating program memory 401A; and the constant voltage power supply 300A that is fed power from the on-vehicle battery 101 so as to supply the predetermined stable control voltage Vcc to the microprocessors. Each of the microprocessors 400A, 400C, and 400D is configured to start the control operation when the power supply switch 110 is closed, perform the predetermined after-run based on the self-holding command signal DR0 or the output enabling signal OUTE even when the power supply switch is opened after the power supply switch 110 is once closed, and then stop by itself.

The constant voltage power supply 300A is configured to be fed the power from the control power supply terminal Vbb that is directly connected to the on-vehicle battery 101 via the reverse current interrupting element 200A for the power supply circuit, and also start the generation of the control voltage Vcc based on the start-up signal STA1 generated by the start-up circuit 310A in response to the operation of the power supply switch 110. The start-up circuit 310A is configured to generate the start-up signal STA1 when the power supply switch 110 is closed, and maintain, when the power supply switch 110 is closed, the generation of the start-up signal STA1 until the after-run is finished even when the power supply switch is opened.

Each of the plurality of on-vehicle electrical loads 121 and 122 is fed the power to be driven from the load power supply terminal Vba, which is connected to the on-vehicle battery 101 via the feeding switching element 120A that enters a closed state at least when the power supply switch 110 is closed, via the series circuit including the reverse current interrupting elements 200a and 200N for the load circuit and corresponding one of the plurality of load switching elements 221 and 222, 221N and 222N, and 221NP and 222NP.

The at least a part of the plurality of load switching elements 221 and 222, 221N and 222N, and 221NP and 222NP includes the field effect transistor that is connected in such a polarity that, when being driven to be energized by the microprocessors 400A, 400C, and 400D, the drive current for any one of the plurality of on-vehicle electrical loads 121 and 122 flows in the opposite direction to the energization direction of the internal parasitic diode.

The reverse current interrupting element 200A for the power supply circuit also includes the field effect transistor that is connected in such a manner that, when the on-vehicle battery 101 is connected in the normal polarity, the field effect transistor is driven to be energized in the same direction as the internal parasitic diode so as to feed the power to the constant voltage power supply 300, and when the on-vehicle battery 101 is connected in the abnormal reverse polarity, the gate voltage becomes the reverse polarity so as to stop the drive for energization.

The reverse current interrupting elements 200a and 200N for the load circuit each include the field effect transistor that is connected in such a manner that, in the case where the on-vehicle battery 101 is connected in the normal polarity when the load current flows, the load current for the plurality of on-vehicle electrical loads 121 and 122 flows in the same direction as the energization direction of the internal parasitic diode, and in the case where the on-vehicle battery 101 is connected in the abnormal reverse polarity, the gate voltage becomes the reverse polarity to interrupt the load current, and is configured to interrupt the energization when the on-vehicle battery 101 is connected in the abnormal reverse polarity.

Further, the reverse current interrupting elements 200a and 200N for the load circuit each are also driven to be closed when being in the state in which the power supply switch 110 is closed or in the state in which the start-up signal STA1 is generated is achieved, and when the state in which the normal polarity power supply voltage is applied to the load power supply terminal Vba is achieved, and the reverse current interrupting elements 200a and 200N for the load circuit each are opened when the power supply switch 110 is opened or when the generation of the start-up signal STA1 is stopped in the case where the short-to-power abnormality in which the load wiring is abnormally brought into contact with the positive wiring of the on-vehicle battery 101 occurs, to thereby prevent the short-to-power current from flowing through the sneak path into the load power supply terminal Vba at least when the feeding switching element 120A is in the opened state.

In addition, reflecting the modified examples illustrated in FIG. 11 and FIG. 12 to the second embodiment (claim 4), the on-vehicle electronic control devices 100B, 100C, and 100D includes: the microprocessors 400B, 400C, and 400D for controlling the drive of the plurality of on-vehicle electrical loads 121 and 122 via the plurality of load switching elements 221 and 222, 221N and 222N, and 221NP and 222NP in response to the operation state of the input sensor group 103 and the content of the cooperating program memory 401B; and the constant voltage power supply 300B that is fed power from the on-vehicle battery 101 so as to supply the predetermined stable control voltage Vcc to the control part. Each of the microprocessors 400B, 400C, and 400D is configured to start the control operation when the power supply switch 110 is closed, perform the predetermined after-run based on the self-holding command signal DR0 or the output enabling signal OUTE even when the power supply switch is opened after the power supply switch 110 is once closed, and then stop by itself.

The constant voltage power supply 300B is configured to be fed power from the load power supply terminal Vba that is connected to the on-vehicle battery 101 via the feeding switching element 120B to generate the stable control voltage Vcc, and the feeding switching element 120B is also driven to be closed by the start-up circuit 310B. The start-up circuit 310B is configured to generate the feeding command signal DRV when the power supply switch 110 is closed, and maintain, when the power supply switch 110 is once closed, the generation of the feeding command signal DRV until the after-run is finished even when the power supply switch 110 is opened.

Each of the plurality of on-vehicle electrical loads 121 and 122 is fed power to be driven from the load power supply terminal Vba via the series circuit including the reverse current interrupting elements 200a and 200N for the load circuit and the load switching elements 221 and 222, 221N and 222N, and 221NP and 222NP, and the at least a part of the plurality of load switching elements 221 and 222, 221N and 222N, and 221NP and 222NP also includes the field effect transistor that is connected in such a polarity that, when being driven to be energized by the microprocessors 400B, 400C, and 400D, the drive current for any one of the plurality of on-vehicle electrical loads 121 and 122 flows in the opposite direction to the energization direction of the internal parasitic diode.

The reverse current interrupting elements 200a and 200N for the load circuit includes the field effect transistor that is connected in such a manner that, in the case where the on-vehicle battery 101 is connected in the normal polarity when the load current flows, the load current for the plurality of on-vehicle electrical loads 121 and 122 flows in the same direction as the energization direction of the internal parasitic diode, and in the case where the on-vehicle battery 101 is connected in the abnormal reverse polarity, the gate voltage becomes the reverse polarity to interrupt the load current, and is configured to interrupt the energization when the on-vehicle battery 101 is connected in the abnormal reverse polarity.

Further, the reverse current interrupting elements 200a and 200N for the load circuit each are driven to be closed when being in the state in which the power supply switch 110 is closed or in the state in which the feeding command signal DRV is generated is achieved, and in the state in which the normal polarity power supply voltage is applied to the load power supply terminal Vba is achieved, and the reverse current interrupting elements 200a and 200N for the load circuit each are opened when the power supply switch 110 is opened or when the generation of the feeding command signal DRV is stopped in the case where the short-to-power abnormality in which the load wiring is abnormally brought into contact with the positive wiring of the on-vehicle battery 101 occurs, to thereby prevent the short-to-power current from flowing through the sneak path into the load power supply terminal Vba at least when the feeding switching element 120B is in the opened state.

What is claimed is:

1. An on-vehicle electronic control device, comprising:
a control part comprising a microprocessor for controlling drive of a plurality of on-vehicle electrical loads via a plurality of load switching elements in response to an operation state of an input sensor group and a content of a cooperating program memory; and
a constant voltage power supply that is fed power from an on-vehicle battery so as to supply a predetermined stable control voltage to the control part,
wherein the microprocessor is configured to start a control operation when a power supply switch is closed, perform a predetermined after-run based on one of a self-holding command signal and an output enabling signal even when the power supply switch is opened after the power supply switch is once closed, and then stop by itself,
wherein the constant voltage power supply is configured to be fed power from a control power supply terminal that is directly connected to the on-vehicle battery via a reverse current interrupting element for a power supply circuit, and start generation of the predetermined stable control voltage based on a start-up signal that is a feeding start signal generated by a start-up circuit in response to an operation of the power supply switch,
wherein the start-up circuit is configured to generate the start-up signal when the power supply switch is closed, and maintain, when the power supply switch is closed, generation of the start-up signal until the predetermined after-run is finished even when the power supply switch is opened,
wherein each of the plurality of on-vehicle electrical loads is fed power to be driven from a load power supply terminal, which is connected to the on-vehicle battery via a feeding switching element that enters a closed state at least when the power supply switch is closed, via a series circuit comprising a reverse current interrupting element for a load circuit and corresponding one of the plurality of load switching elements,
wherein at least a part of the plurality of load switching elements comprises a field effect transistor that is connected in such a polarity that, when being driven to be energized by the microprocessor, a drive current for any one of the plurality of on-vehicle electrical loads flows in an opposite direction to an energization direction of an internal parasitic diode of the field effect transistor,
wherein the reverse current interrupting element for a power supply circuit comprises a field effect transistor that is connected in such a manner that, when the on-vehicle battery is connected in a normal polarity, the field effect transistor is driven to be energized in the same direction as an internal parasitic diode of the field effect transistor so as to feed power to the constant voltage power supply, and when the on-vehicle battery is connected in an abnormal reverse polarity, a gate voltage becomes a reverse polarity so as to stop drive for energization,
wherein the reverse current interrupting element for a load circuit comprises a field effect transistor that is connected in such a manner that, in a case where the on-vehicle battery is connected in the normal polarity when a load current flows, the load current for the plurality of on-vehicle electrical loads flows in the same direction as an energization direction of an internal parasitic diode of the field effect transistor, and in a case where the on-vehicle battery is connected in the abnormal reverse polarity, a gate voltage becomes a reverse polarity to interrupt the load current,
wherein the reverse current interrupting element for a load circuit is configured to interrupt energization when the on-vehicle battery is connected in the abnormal reverse polarity, wherein the reverse current interrupting element for a load circuit is driven to be closed when one of a state in which the power supply switch is closed and a state in which the start-up signal is generated is achieved, and when a state in which a normal polarity power supply voltage is applied to the load power supply terminal is achieved, and wherein the reverse current interrupting element for a load circuit is opened one of when the power supply switch is opened and when generation of the start-up signal is stopped in a case where a short-to-power abnormality in which load wiring is abnormally brought into contact with positive wiring of the on-vehicle battery occurs, to thereby prevent a short-to-power current from flowing through a sneak path into the load power supply terminal at least when the feeding switching element is in an opened state.

2. The on-vehicle electronic control device according to claim 1, wherein the control power supply terminal, which is connected to the on-vehicle battery, is connected to a protective circuit comprising at least one of a polar capacitor or a constant voltage diode for surge absorption, and wherein the reverse current interrupting element for a power supply circuit is connected between the control power supply terminal and the protective circuit.

3. The on-vehicle electronic control device according to claim 2, wherein the constant voltage power supply is further configured to generate the predetermined stable control voltage for driving the control part, and a backup voltage for feeding power to a cooperating RAM memory when the microprocessor is stopped, and wherein the reverse current interrupting element for a power supply circuit is connected to a reverse current stop gate circuit for a power supply circuit, which drives to energize the reverse current interrupting element for a power supply circuit based on the same start-up signal as the start-up signal for the constant voltage power supply.

4. The on-vehicle electronic control device according to claim 1, wherein the constant voltage power supply is further configured to generate the predetermined stable control voltage for driving the control part, and a backup voltage for feeding power to a cooperating RAM memory when the microprocessor is stopped, and wherein the reverse current interrupting element for a power supply circuit is connected to a reverse current stop gate circuit for a power supply circuit, which drives to energize the reverse current interrupting element for a power supply circuit based on the same start-up signal as the start-up signal for the constant voltage power supply.

5. The on-vehicle electronic control device according to claim 1, wherein the start-up circuit is further configured to generate the feeding start signal when a waking start-up circuit that is fed power from the control power supply terminal directly connected to the on-vehicle battery generates a waking start-up signal even if the power supply switch is not closed, wherein the waking start-up circuit comprises one of:
a timer circuit for generating an end-of-time signal that becomes a waking command signal when an open period of the power supply switch has elapsed for a predetermined period; and
a communication circuit for generating the waking command signal received from a host station via a communication line, wherein the microprocessor is further configured to one of generate the self-holding command signal and generate a watchdog signal to be output to a watchdog timer when the constant voltage power supply generates the predetermined stable control voltage based on the waking command signal so as to activate the microprocessor, the watchdog timer generating the output enabling signal when a signal pulse width of the watchdog signal is less than a predetermined value, and wherein the microprocessor is further configured to one of write a time period from a predetermined event-run to a next waking activation to the waking start-up circuit and transmit the time period to the host station via the communication line, and then stop generation of one of the self-holding command signal and the watchdog signal.

6. The on-vehicle electronic control device according to claim 1, wherein the microprocessor is further configured to one of:

drive to close the reverse current interrupting element for a load circuit via a reverse current stop gate circuit for a load circuit based on a monitor voltage of a command monitor signal for monitoring a closed state of the power supply switch and a monitor voltage of a power receiving monitor signal for monitoring the closed state of the feeding switching element when both of the monitor voltages have a predetermined value or more, and interrupt, after the reverse current interrupting element for a load circuit is once driven to be closed, a gate circuit in the reverse current stop gate circuit for a load circuit with respect to the reverse current interrupting element for a load circuit when the power supply switch is opened; and drive to close the reverse current interrupting element for a load circuit when the feeding start signal is generated and the monitor voltage of the power receiving monitor signal is equal to or more than a predetermined voltage even if the power supply switch is not closed, and open, after the reverse current interrupting element for a load circuit is once driven to be closed, the reverse current interrupting element for a load circuit when the feeding start signal is stopped.

7. The on-vehicle electronic control device according to claim 1, wherein the microprocessor and the cooperating program memory incorporate a control program that is short-to-power abnormality detection section, wherein the short-to-power abnormality detection section is configured to compare logic states of load drive command signals for the plurality of load switching elements with signal voltage levels of load voltage monitor signals that are proportional to output voltages of the plurality of load switching elements, and determine that there is a risk of occurrence of the short-to-power abnormality when the load voltage monitor signals are generated even if the plurality of load switching elements are opened, and wherein the microprocessor is further configured to open all of the plurality of load switching elements and the reverse current interrupting element for a load circuit when at least the feeding switching element is opened in a case where the short-to-power abnormality detection section determines that there is the risk of the short-to-power abnormality.

8. The on-vehicle electronic control device according to claim 1, wherein the plurality of on-vehicle electrical loads are incorporated in an on-vehicle electrical load group comprising a light load represented by an exciting coil of a load power supply relay having a small energization current, the light load being controlled to be driven from the power supply switch via a series circuit comprising a light load switching element and a reverse current blocking diode.

9. The on-vehicle electronic control device according to claim 1,
wherein a power supply switch terminal, which is connected to the on-vehicle battery via the power supply switch, is connected to a protective circuit comprising at least one of a polar capacitor or a constant voltage diode for surge absorption,
wherein the power supply switch terminal and the protective circuit have a reverse current interrupting element for a protective circuit connected therebetween,
wherein the microprocessor is further configured to:
determine that the power supply switch is closed based on a monitor voltage of a command monitor signal for monitoring a closed state of the power supply switch when the monitor voltage is increased up to a first predetermined voltage, and drive to close the reverse current interrupting element for a protective circuit via a reverse current stop gate circuit for a protective circuit; and
determine that the power supply switch is opened when the monitor voltage is reduced to be less than a second predetermined voltage that is a value equal to or less than the first predetermined voltage, and open the reverse current interrupting element for a protective circuit, and
wherein the start-up circuit is configured in a state that enables generation of the feeding start signal when the power supply switch is closed and a voltage equal to or more than a third predetermined voltage that is a voltage further lower than the second predetermined voltage is applied to the start-up circuit.

10. An on-vehicle electronic control device, comprising:
a control part comprising a microprocessor for controlling drive of a plurality of on-vehicle electrical loads via a plurality of load switching elements in response to an operation state of an input sensor group and a content of a cooperating program memory; and
a constant voltage power supply that is fed power from an on-vehicle battery so as to supply a predetermined stable control voltage to the control part,
wherein the microprocessor is configured to start a control operation when a power supply switch is closed, perform a predetermined after-run based on one of a self-holding command signal and an output enabling signal even when the power supply switch is opened after the power supply switch is once closed, and then stop by itself,
wherein the constant voltage power supply is configured to be fed power from a load power supply terminal that is connected to the on-vehicle battery via a feeding switching element to generate the predetermined stable control voltage, the feeding switching element being driven to be closed by a start-up circuit,
wherein the start-up circuit is configured to generate a feeding command signal corresponding to a feeding start signal when the power supply switch is closed, and maintain, when the power supply switch is once closed, generation of the feeding command signal until the predetermined after-run is finished even when the power supply switch is opened,
wherein each of the plurality of on-vehicle electrical loads is fed power to be driven from the load power supply terminal via a series circuit comprising a reverse current interrupting element for a load circuit and corresponding one of the plurality of load switching elements,
wherein at least a part of the plurality of load switching elements comprises a field effect transistor that is connected in such a polarity that, when being driven to be energized by the microprocessor, a drive current for any one of the plurality of on-vehicle electrical loads flows in an opposite direction to an energization direction of an internal parasitic diode of the field effect transistor,
wherein the reverse current interrupting element for a load circuit comprises a field effect transistor that is connected in such a manner that, in a case where the on-vehicle battery is connected in a normal polarity when a load current flows, the load current for the plurality of on-vehicle electrical loads flows in the same direction as an energization direction of an internal parasitic diode of the field effect transistor, and in a case where the on-vehicle battery is connected in an abnormal reverse polarity, a gate voltage becomes a reverse polarity to interrupt the load current,
wherein the reverse current interrupting element for a load circuit is configured to interrupt energization when the on-vehicle battery is connected in the abnormal reverse polarity,
wherein the reverse current interrupting element for a load circuit is driven to be closed when one of a state in which the power supply switch is closed and a state in which the feeding command signal is generated is achieved, and when a state in which a normal polarity power supply voltage is applied to the load power supply terminal is achieved, and
wherein the reverse current interrupting element for a load circuit is opened one of when the power supply switch is opened and when generation of the feeding command signal is stopped in a case where a short-to-power abnormality in which load wiring is abnormally brought into contact with positive wiring of the on-vehicle battery occurs, to thereby prevent a short-to-power current from flowing through a sneak path into the load power supply terminal at least when the feeding switching element is in an opened state.

11. The on-vehicle electronic control device according to claim 10,
wherein the load power supply terminal connected to the on-vehicle battery via the feeding switching element is connected to a protective circuit comprising at least one of a polar capacitor or a constant voltage diode for surge absorption,
wherein the feeding switching element comprises one of:
an output contact of an electromagnetic relay in which a reverse excitation preventing diode is connected to an exciting coil, the output contact being prevented from performing a closure operation when a connection polarity of the on-vehicle battery is improper so as to achieve protection against reverse connection; and
a non-contact switching element in which a pair of field effect transistors is connected in series so that energization directions of internal parasitic diodes thereof are opposite to each other, to thereby achieve protection against the reverse connection and perform a switching operation, and wherein, when the feeding switching element comprises the non-contact switching element, the feeding switching element is connected one of between the on-vehicle battery and the load power supply terminal and between the load power supply terminal and the protective circuit.

12. The on-vehicle electronic control device according to claim 11, wherein, when the feeding switching element comprises the output contact of the electromagnetic relay, the constant voltage power supply starts to generate the predetermined stable control voltage based on a start-up signal generated by the start-up circuit in response to an operation of the power supply switch, wherein the start-up signal is the same signal as the feeding command signal, or, in response to generation of the feeding command signal, the feeding switching element is closed and then the start-up signal is generated, and when the feeding command signal is cancelled, the start-up signal is cancelled prior thereto, and wherein the constant voltage power supply is one of activated and stopped in association with one of a closing command and an opening command of the feeding switching element, or the constant voltage power supply is one of activated in a delayed manner and stopped earlier as compared to one of the closing command and the opening command of the feeding switching element.

13. The on-vehicle electronic control device according to claims 10, wherein the start-up circuit is further configured to generate the feeding start signal when a waking start-up circuit that is fed power from the control power supply terminal directly connected to the on-vehicle battery generates a waking start-up signal even if the power supply switch is not closed, wherein the waking start-up circuit comprises one of:
    a timer circuit for generating an end-of-time signal that becomes a waking command signal when an open period of the power supply switch has elapsed for a predetermined period; and
    a communication circuit for generating the waking command signal received from a host station via a communication line, wherein the microprocessor is further configured to one of generate the self-holding command signal and generate a watchdog signal to be output to a watchdog timer when the constant voltage power supply generates the predetermined stable control voltage based on the waking command signal so as to activate the microprocessor, the watchdog timer generating the output enabling signal when a signal pulse width of the watchdog signal is less than a predetermined value, and wherein the microprocessor is further configured to one of write a time period from a predetermined event-run to a next waking activation to the waking start-up circuit and transmit the time period to the host station via the communication line, and then stop generation of one of the self-holding command signal and the watchdog signal.

14. The on-vehicle electronic control device according to claim 10, wherein the microprocessor is further configured to one of:

drive to close the reverse current interrupting element for a load circuit via a reverse current stop gate circuit for a load circuit based on a monitor voltage of a command monitor signal for monitoring a closed state of the power supply switch and a monitor voltage of a power receiving monitor signal for monitoring the closed state of the feeding switching element when both of the monitor voltages have a predetermined value or more, and interrupt, after the reverse current interrupting element for a load circuit is once driven to be closed, a gate circuit in the reverse current stop gate circuit for a load circuit with respect to the reverse current interrupting element for a load circuit when the power supply switch is opened; and drive to close the reverse current interrupting element for a load circuit when the feeding start signal is generated and the monitor voltage of the power receiving monitor signal is equal to or more than a predetermined voltage even if the power supply switch is not closed, and open, after the reverse current interrupting element for a load circuit is once driven to be closed, the reverse current interrupting element for a load circuit when the feeding start signal is stopped.

15. The on-vehicle electronic control device according to claim 10, wherein the microprocessor and the cooperating program memory incorporate a control program that is short-to-power abnormality detection section, wherein the short-to-power abnormality detection section is configured to compare logic states of load drive command signals for the plurality of load switching elements with signal voltage levels of load voltage monitor signals that are proportional to output voltages of the plurality of load switching elements, and determine that there is a risk of occurrence of the short-to-power abnormality when the load voltage monitor signals are generated even if the plurality of load switching elements are opened, and wherein the microprocessor is further configured to open all of the plurality of load switching elements and the reverse current interrupting element for a load circuit when at least the feeding switching element is opened in a case where the short-to-power abnormality detection section determines that there is the risk of the short-to-power abnormality.

16. The on-vehicle electronic control device according to claim 10, wherein the plurality of on-vehicle electrical loads are incorporated in an on-vehicle electrical load group comprising a light load represented by an exciting coil of a load power supply relay having a small energization current, the light load being controlled to be driven from the power supply switch via a series circuit comprising a light load switching element and a reverse current blocking diode.

17. The on-vehicle electronic control device according to claim 10, wherein a power supply switch terminal, which is connected to the on-vehicle battery via the power supply switch, is connected to a protective circuit comprising at least one of a polar capacitor or a constant voltage diode for surge absorption, wherein the power supply switch terminal and the protective circuit have a reverse current interrupting element for a protective circuit connected therebetween, wherein the microprocessor is further configured to:
    determine that the power supply switch is closed based on a monitor voltage of a command monitor signal for monitoring a closed state of the power supply switch when the monitor voltage is increased up to a first predetermined voltage, and drive to close the reverse current interrupting element for a protective circuit via a reverse current stop gate circuit for a protective circuit; and determine that the power supply switch is opened when the monitor voltage is reduced to be less than a second predetermined voltage that is a value equal to or less than the first predetermined voltage, and open the reverse current interrupting element for a protective circuit, and wherein the start-up circuit is configured in a state that enables generation of the feeding start signal when the power supply switch is closed and a voltage equal to or more than a third predetermined voltage that is a voltage further lower than the second predetermined voltage is applied to the start-up circuit.

* * * * *